(12) United States Patent
Walker et al.

(10) Patent No.: US 11,798,067 B2
(45) Date of Patent: *Oct. 24, 2023

(54) RESTOCKING HUB WITH INTERCHANGEABLE BUTTONS MAPPED TO ITEM IDENTIFIERS

(71) Applicant: Staples, Inc., Framingham, MA (US)

(72) Inventors: M. Steven Walker, Andover, MA (US); Ranjeet Sonone, San Jose, CA (US); Faisal Masud, Fall City, WA (US)

(73) Assignee: Staples, Inc., Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,585

(22) Filed: Apr. 25, 2022

(65) Prior Publication Data
US 2022/0245717 A1 Aug. 4, 2022

Related U.S. Application Data

(63) Continuation of application No. 16/425,363, filed on May 29, 2019, now Pat. No. 11,315,174.
(Continued)

(51) Int. Cl.
*G06Q 30/06* (2023.01)
*G06F 9/451* (2018.01)
(Continued)

(52) U.S. Cl.
CPC ......... *G06Q 30/0643* (2013.01); *G06F 9/451* (2018.02); *G06Q 10/087* (2013.01);
(Continued)

(58) Field of Classification Search
CPC ............ G06Q 30/0643; G06Q 10/087; G06Q 30/0633; G06F 9/451; G08C 17/02; G08C 2201/93
(Continued)

(56) References Cited

U.S. PATENT DOCUMENTS 5,862,071 A * 1/1999 Scholder ............... H01H 13/52
365/63
5,960,411 A 9/1999 Hartman et al.
(Continued)

FOREIGN PATENT DOCUMENTS

CA 2788131 A1 8/2011
CA 2928057 A1 10/2016

OTHER PUBLICATIONS

Amazon Dash, Wikipedia, Wikimedia Foundation, Jul. 29, 2018, en.wikipedia.org/wiki/Amazon_Dash.
(Continued)

*Primary Examiner* — Yong Hang Jiang
(74) *Attorney, Agent, or Firm* — VLP Law Group LLP; Michel Bohn

(57) ABSTRACT

A restocking hub with interchangeable buttons mapped to item identifiers is described herein. In some instances, a local hub may receive an actuation signal from a particular interchangeable button communicatively coupled with the local hub. The actuation signal may include a button ID that identifies the particular interchangeable button and may indicating an actuation of the particular interchangeable button. The local hub may generate an order signal identifying the button ID based on the actuation signal, and may transmit the order signal instructing a remote server to perform a defined operation using the button ID. In some instances, the local hub may output a confirmation notification based on data received from the remote server based on the defined operation.

20 Claims, 12 Drawing Sheets

Related U.S. Application Data

(60) Provisional application No. 62/677,664, filed on May 29, 2018.

(51) Int. Cl.
*G06Q 10/08* (2023.01)
*G08C 17/02* (2006.01)
*G06Q 30/0601* (2023.01)
*G06Q 10/087* (2023.01)

(52) U.S. Cl.
CPC ......... *G06Q 30/0633* (2013.01); *G08C 17/02* (2013.01); *G08C 2201/21* (2013.01); *G08C 2201/93* (2013.01)

(58) Field of Classification Search
USPC .................................. 340/12.5, 12.1, 12.22
See application file for complete search history.

(56) References Cited

U.S. PATENT DOCUMENTS

| | | | |
|---|---|---|---|
| 6,473,739 B1 | 10/2002 | Showghi et al. | |
| 6,678,268 B1 | 1/2004 | Francis et al. | |
| 6,937,999 B1 | 8/2005 | Haines et al. | |
| 7,030,731 B2 | 4/2006 | Lastinger et al. | |
| 7,155,403 B2 | 12/2006 | Cirulli et al. | |
| 7,246,746 B2 | 7/2007 | McNamara et al. | |
| D551,038 S | 9/2007 | Evaimalo et al. | |
| 7,589,616 B2 | 9/2009 | Klatsmanyi et al. | |
| 7,698,169 B2 | 4/2010 | Raccah et al. | |
| 7,870,041 B2 | 1/2011 | Henderson et al. | |
| 7,881,987 B1 | 2/2011 | Hart et al. | |
| 7,908,185 B2 | 3/2011 | Yeow et al. | |
| 8,077,041 B2 | 12/2011 | Stern et al. | |
| 8,126,784 B1 | 2/2012 | Agarwal | |
| 8,161,119 B2 | 4/2012 | Pirzada et al. | |
| 8,390,442 B2 | 3/2013 | Burns et al. | |
| 8,636,208 B2 | 1/2014 | Urban et al. | |
| 8,639,549 B2 | 1/2014 | Pathak et al. | |
| 8,818,877 B2 | 8/2014 | Blanchard, Jr. et al. | |
| 9,019,076 B2* | 4/2015 | Eckerdt .................... | G05B 1/01 340/568.1 |
| 9,036,792 B2 | 5/2015 | Cacioppo et al. | |
| 9,269,022 B2 | 2/2016 | Rhoads et al. | |
| D767,568 S | 9/2016 | McWilliam | |
| 9,443,370 B2 | 9/2016 | Carson et al. | |
| 9,514,589 B2 | 12/2016 | Raina et al. | |
| 9,576,412 B2 | 2/2017 | Gudmundsson et al. | |
| 9,602,172 B2 | 3/2017 | Jackson et al. | |
| 9,633,493 B2 | 4/2017 | Raina et al. | |
| 9,652,894 B1 | 5/2017 | Weekly et al. | |
| 9,959,437 B1 | 5/2018 | Ramos et al. | |
| 9,990,659 B2 | 6/2018 | Shanmugam et al. | |
| 10,217,529 B2 | 2/2019 | Greco et al. | |
| 10,285,003 B2 | 5/2019 | Burch et al. | |
| 10,438,276 B2 | 10/2019 | Godsey et al. | |
| 10,504,179 B1 | 12/2019 | McGuire et al. | |
| 10,531,304 B2 | 1/2020 | Zeiler et al. | |
| 10,542,382 B2 | 1/2020 | Good et al. | |
| 10,573,134 B1 | 2/2020 | Zalewski et al. | |
| 11,074,643 B1 | 7/2021 | Ellithorpe et al. | |
| 2002/0082042 A1 | 6/2002 | Mark et al. | |
| 2003/0030568 A1 | 2/2003 | Lastinger et al. | |
| 2004/0249727 A1 | 12/2004 | Cook et al. | |
| 2005/0065858 A1 | 3/2005 | Tenzer et al. | |
| 2007/0070831 A1 | 3/2007 | Schobben et al. | |
| 2007/0106570 A1 | 5/2007 | Hartman et al. | |
| 2010/0211636 A1 | 8/2010 | Starkenburg et al. | |
| 2011/0295724 A1 | 12/2011 | Hill | |
| 2012/0268236 A1* | 10/2012 | Eckerdt .................... | G05B 1/01 340/5.6 |
| 2012/0305655 A1* | 12/2012 | Eckerdt .................. | A47G 29/10 235/492 |
| 2012/0330201 A1 | 12/2012 | Turner et al. | |
| 2013/0151355 A1 | 6/2013 | Abromovitz et al. | |
| 2013/0286046 A1 | 10/2013 | Rodriguez | |
| 2013/0325672 A1 | 12/2013 | Odenheimer et al. | |
| 2014/0214547 A1 | 7/2014 | Signorelli et al. | |
| 2014/0279188 A1 | 9/2014 | Powell et al. | |
| 2014/0279297 A1 | 9/2014 | Morgan et al. | |
| 2015/0016712 A1 | 1/2015 | Rhoads et al. | |
| 2015/0149307 A1 | 5/2015 | Thukral | |
| 2015/0164259 A1* | 6/2015 | Eckerdt .................. | A47G 29/10 248/220.22 |
| 2015/0258458 A1* | 9/2015 | Zhang .................. | H04L 67/131 463/43 |
| 2015/0302510 A1 | 10/2015 | Godsey et al. | |
| 2015/0348146 A1 | 12/2015 | Shanmugam et al. | |
| 2015/0382390 A1 | 12/2015 | Wong et al. | |
| 2016/0019888 A1 | 1/2016 | Shigenaga et al. | |
| 2016/0029148 A1 | 1/2016 | Jackson et al. | |
| 2016/0055689 A1 | 2/2016 | Raina et al. | |
| 2016/0055690 A1 | 2/2016 | Raina et al. | |
| 2016/0055698 A1 | 2/2016 | Gudmundsson et al. | |
| 2016/0196526 A1* | 7/2016 | Khalid .................... | H04W 4/80 705/28 |
| 2016/0261917 A1 | 9/2016 | Trollope et al. | |
| 2016/0314518 A1 | 10/2016 | Goodwin et al. | |
| 2016/0371274 A1 | 12/2016 | Ng et al. | |
| 2017/0083965 A1 | 3/2017 | Sun | |
| 2017/0123596 A1 | 5/2017 | Kashima | |
| 2019/0035010 A1 | 1/2019 | Ittah | |
| 2019/0114699 A1 | 4/2019 | Cook et al. | |
| 2019/0295150 A1 | 9/2019 | High et al. | |
| 2019/0318729 A1 | 10/2019 | Chao et al. | |

OTHER PUBLICATIONS

Amazon dashbutton1, "Quick start guide for dash button device", Amazon.com, dates Apr. 3, 2015. (Year: 2015).

Amazondashbutton2, "Place it press it got it", Waybackmachine, dated Apr. 20, 2015. (Year: 2015).

Amazondashbutton3, Pierce, David, "Amazon is going to let your gadgets order groceries automatically", Wired, dated Mar. 31, 2015.

Amazondashbutton4, "How dash replenishment service works", waybackmachine, dated Apr. 7, 2015. (Year: 2015).

Amazondashbutton5, "Hoe does Amazon Dash button work", Quora.com, dated Apr. 1, 2015 (Year: 2015).

Amazondashbutton6, Fletcher Gordon, "Amazon dash button is a first step towards internet of things that is actually useful", The Connection, dated Apr. 8, 2015. (Year: 2015).

Bond, Ronald L. "What You Need to Know About Managing Retail Inventory" (2013) Entrepreneur.com (Year: 2013).

Freidman, Dick. "Inventory management tips" (2016) Supply House Times. (Year: 2016).

IBeacon for Logistics: A Use Case in Facilities, Asset, & Inventory Management, download from http://apsima.com/blog/ibeacon-for-logistics-facilities-asset-inventory-m-anagement/> Apr. 17, 2015 (3 pages).

QStock, "Inventory Audit Checklist", QStock Inventory, dated Jun. 6, 2015 (Year: 2015).

Roberts, Emily, Introducing the Amazon Dash Button and Dash Replenishment Service, Appstore Blogs, Mar. 31, 2015, https://developer.amazon.com/blogs/post/Tx3N3VXXO52B15I/Introduc.

Sharifat, Amir, Flic—The Bluetooth Smart Button, Indiegogo, Nov. 19, 2017, www.indiegogo.com/products/flic-the-bluetooth-smart-button.

StickNFind enterprise grade beacons helps streamline the process of monitoring, maintaining and managing the organization's valuable property that keep an organization running, download from https://www.sticknfind.com/enterprise.aspx> Apr. 17, 2015 (6 pages).

Williams, David. "QuickBooks Introduces New Reorder Points that Tell When Inventory is Running Low" Small Business Trends. SmallBizTrends.com (Year: 2017).

Epstein, Curt, "Traxxall To Debut New Parts Inventory Tracking Software", AINOnline.com, Oct. 18, 2016 (1 page).

(56) References Cited

OTHER PUBLICATIONS

Porter, Michael E. et al. "Why Every Organization Needs an Augmented Reality Strategy" Harvard Business Review, hbr.org (Year: 2017).

* cited by examiner

RESTOCKING HUB WITH INTERCHANGEABLE BUTTONS MAPPED TO ITEM IDENTIFIERS

BACKGROUND

The present disclosure relates to technology for, among other things, providing intelligent item tracking and expedited item reordering by stakeholders. Some implementations relate to programmable smart buttons and smart button hangers.

Stock rooms, kitchens, and other similar facilities often stock large numbers of items. Some items are consumed and replaced on a regular basis, while others wear out and are replaced sporadically. Currently, individuals, such as facilities managers, review the stock of items in a stock room, manually calculate which items and how many of each item to order to keep the stock rooms stocked. Typically, individuals use a pen and paper to take notes and then manually review the notes to find the items on a computer or in a catalog. This manual review and re-order process can be extremely time consuming and inaccurate. For instance, in some larger buildings with multiple stock rooms, closets, or kitchens, a facilities manager may expend dozens of hours per week just maintaining inventory.

More recently, solutions have attempted to address the limitations of manual reordering through automatic delivery subscriptions or dedicated ordering devices. Automatic delivery subscriptions often result in an over or understock of items as usage can be variable and unpredictable, and subscriptions fail to address new or irregularly ordered items. Some solutions include dedicated re-ordering devices, such as a computing device with an Internet connection (e.g., via a cellular network or Wi-Fi) that is configured to order a specific quantity of a specific item. However, these dedicated ordering devices are expensive due to their direct connection to the internet and internal computation capabilities, cannot order varying quantities of an item, and cannot be programmed to a specific item.

SUMMARY

According to one innovative aspect of the subject matter described in this disclosure, a system may include: a button holder including a button mount and an electrical contact, the button mount receiving and retaining an interchangeable button, the electrical contact providing electrical power to the interchangeable button; the interchangeable button storing a button identification code (button ID), the interchangeable button being adapted to transmit the button ID; and a local hub including a processor and a communication unit, the communication unit transmitting data to and receiving data from a remote server, the communication unit receiving the button ID from one or more of the interchangeable button and the button holder.

Implementations may include one or more of the following features. The system where the local hub includes a non-transitory memory storing instructions that, when executed by the processor, cause the local hub to: receive an actuation signal from the interchangeable button via the communication unit, the actuation signal including the button ID, the actuation signal indicating an actuation of the interchangeable button; generate one or more order signals based on the actuation signal, the one or more order signals identifying the button ID; and transmit the one or more order signals to the remote server based on the interchangeable button being actuated and the local hub receiving the actuation signal from the interchangeable button, the order signal instructing the remote server to perform a defined operation using the button ID. The system where the instructions further cause the local hub to: activate a microphone coupled with the local hub; receive audio from the microphone coupled with the local hub; process the audio to determine a quantity; and generate the one or more order signals based on the quantity. The system where the instructions further cause the local hub to: match the audio received from the microphone against an audio wave profile from a set of audio wave profiles, the local hub storing the set of audio wave profiles on a local storage device coupled with the local hub; and determine the quantity based on the matched audio wave profile.

Implementations may additionally or alternatively include one or more of the following features. The system where the local hub activates the microphone coupled with the local hub for a defined time period and deactivates the microphone after an expiration of the defined time period, the microphone being activated based on the actuation signal received from the interchangeable button. The system where the instructions further cause the local hub to: receive a quantity signal from a keypad mechanism communicatively coupled with the local hub, the quantity signal identifying a number; and generate the one or more order signals based on the quantity signal received from the keypad mechanism. The system where the keypad mechanism is communicatively coupled with the local hub via a wireless data connection, the wireless data connection allowing data to be transferred from the keypad mechanism to the local hub. The system where the keypad mechanism is integrated with the button holder in a hanger body of the button holder. The system where the interchangeable button includes a second communication unit providing a wireless communication channel between the interchangeable button and the communication unit of the local hub. The system where the button holder receives an actuation signal from the interchangeable button and transmits the actuation signal from the interchangeable button to the local hub. The system where the button holder is physically coupled with the interchangeable button using the electrical contact and wirelessly coupled with the local hub using the communication unit, the button holder including a corresponding communication unit adapted to transmit data to the communication unit of the local hub. The system where the button holder includes an elongated body adapted to fit on a front of a shelf and a plurality of button mounts positioned longitudinally along a length of the elongated body. The system where the remote server determines attributes of an item associated with the interchangeable button based on the button ID and a mapping of button IDs stored on a database accessible to the remote server, and transmits an instruction to the local hub based on the attributes of the item.

Another general aspect may include a computer-implemented method including: receiving, by a server, an order signal from a remote interchangeable-button hub coupled with one or more interchangeable buttons, the order signal including a button identification code (button ID) identifying a particular interchangeable button of the one or more interchangeable buttons and an instruction to the server to perform an operation using the button ID, the order signal indicating actuation of the particular interchangeable button; determining, by the server, attributes of an item associated with the particular interchangeable button based on the button ID, a mapping of button IDs stored on a database accessible to the server, and the instruction to the server to perform the operation using the button ID; executing, by the server, the operation based on the order signal; and transmitting, by the server, a confirmation notification to the remote interchangeable-button hub based on the operation. Other embodiments of this aspect include corresponding computer systems, apparatus, and computer programs recorded on one or more computer storage devices, each configured to perform the actions of the methods.

The features and advantages described herein are not all-inclusive and many additional features and advantages will be apparent to one or ordinary skill in the art in view of the figures and description. Moreover it should be noted that the language used in the specification has been selected for readability and instructional purposes and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
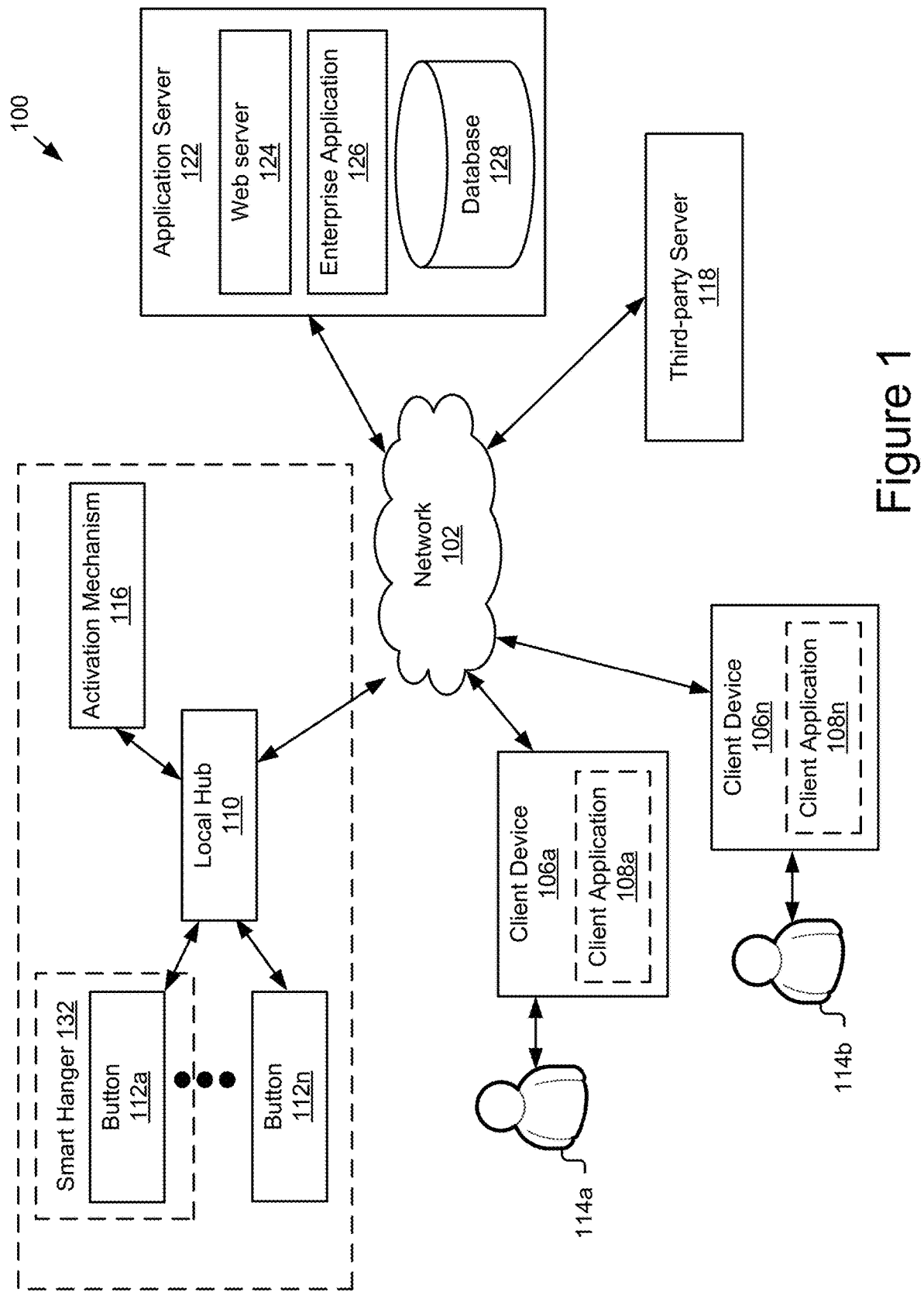
FIG. 1 is a block diagram of an example system for inventory tracking and restocking using interchangeable and mappable buttons and hubs associated with the buttons.

The technology disclosed in this application allows stakeholders, such as a person responsible for ordering and reordering items for an organization (e.g., business, family, etc.), to conveniently and easily track and reorder the items. The technology may include one or more ordering devices configured to facilitate ordering or reordering of products. In some implementations, the technology disclosed in this application allows users to easily and conveniently (re)order items via an online marketplace using a dedicated ordering device, such as a specialized button 112.

The features and advantages described herein are not all-inclusive and many additional features and advantages are within the scope of the present disclosure. Moreover, it should be noted that the language used in the present disclosure has been principally selected for readability and instructional purposes, and not to limit the scope of the subject matter disclosed herein.

The technology described herein provides for communication among interchangeable buttons 112 in a stock room, a local hub 110, and/or a remote server 122. The communication performed by the technology, such as the systems, methods, devices, and other aspects, can provide numerous advantages, such as simplifying ordering of items for restocking stock rooms and/or providing for an automatic inventory management system of an organization.

The technology may include interchangeable and, in some implementations, programmable/customizable buttons 112 that communicate with a local hub 110, which relays signals for processing to the remote server 122.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a block diagram of an example system 100 for inventory tracking and restocking using interchangeable and mappable buttons 112 and communication hubs. The illustrated system 100 may include client devices 106a . . . 106n, which may run client applications 108a . . . 108n, a third-party server 118, a local hub 110, buttons 112a . . . 112n, and an application server 122, which are electronically communicatively coupled via a network 102 for interaction with one another, although other system configurations are possible including other devices, systems, and networks. For example, the system 100 could include any number of client devices 106, third-party servers 118, application servers 122, and other systems and devices.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device 106 includes one or more computing devices having data processing and communication capabilities. The client device 106 may couple to and communicate with other client devices 106 and the other entities of the system 100 via the network 102 using a wireless and/or wired connection, such as the local hub 110 or the application server 122. Examples of client devices 106 may include, but are not limited to, mobile phones, tablets, laptops, desktops, netbooks, server appliances, servers, virtual machines, TVs, etc. The system 100 may include any number of client devices 106, including client devices 106 of the same or different type.

A plurality of client devices 106a . . . 106n are depicted in FIG. 1 to indicate that the application server 122 and its components may aggregate information about and provide data associated with the systems and processes described herein to a multiplicity of users 114a . . . 114n on a multiplicity of client devices 106a . . . 106n. In some implementations, a single user may use more than one client device 106, which the application server 122 may track and aggregate interaction data associated with the user through a variety of different channels including online, physical, and phone (e.g., text, voice, etc.) channels, as discussed elsewhere herein. In some implementations, the application server 122 may communicate with and provide information to a client device 106 of a manager of an organization to track orders and inventory among a plurality of stock rooms, closets, kitchens, etc., where local hubs 110 and buttons 112 may be present. For instance, the application server 122 may send data, such as graphical user interfaces, receipts, and confirmation messages, etc., to a client application 108a . . . 108n on a client device 106a . . . 106n.

The local hub 110 may include a computing device having one or more communication units (e.g., as described in reference to FIG. 6) for communicating with one or a plurality of buttons 112a . . . 112n, a smart hanger 132, and/or a server 122, a processor, a memory, and an output device, although additional or fewer components are possible depending on the implementation. The local hub 110 may include a non-transitory memory storing instructions that, when executed by the processor, cause the local hub 110 to perform operations described herein.

The local hub 110 may be placed in the vicinity of one or more buttons 112, for example, in a stock room, closet, or another physical location with inventory that may be replenished. For instance, in some implementations, the local hub 110 may be within range of wireless communication with buttons 112 (or a smart button hanger 132, as described in further detail below).

The local hub 110 may establish or maintain a wired or wireless connection with the buttons 112 via the communication unit of the local hub 110. In some implementations, the connection with the buttons 112 may be established via a smart button hanger 132, as described in further detail below. For example, the local hub 110 may include one or more communication units (e.g., Bluetooth radios) configured to communicate with a communication unit (e.g., a Bluetooth radio) of one or more of the buttons 112 and/or smart button hangers 132. In other implementations, the local hub 110 may interface with the button 112 using other wired or wireless communication technologies. In implementations where the connection between the local hub 110 and the buttons 112 is Bluetooth, for example, the Bluetooth pairing may be performed in advance by a manufacturer or via simple pairing technique (e.g., by pressing and holding a button 112 or the smart button hanger 132 and activating pairing mode on the local hub 110).

A communication unit of the local hub 110 may connect to the application server 122 using a wired or wireless connection, such as a Wi-Fi™ (e.g., via a local modem and/or Wi-Fi router), Bluetooth, or a cellular radio. For example, in some implementations, the local hub 110 may include a cellular data modem allowing it to exchange data with the application server 122 with minimal set-up (e.g., connecting to a local area network, which is connected to the Internet).

In some implementations, an output device of the local hub 110 may include a speaker, a display screen, or other output interface. For example, the local hub 110 may include a speaker coupled to a speech engine (e.g., a software service that translates data into synthetic speech) for outputting instructions, confirmatory notifications, item, order, or price information, etc., based on instructions received from an application server 122, for example.

In some implementations, the local hub 110 may also include one or more integrated buttons 112, touch screens, microphones, or other input devices, and may include communication mechanisms for connecting the local hub 110 with the network 102, the application server 122, a client device 106, buttons 112, etc., or for providing other input for modifying or canceling orders, activating buttons 112, or performing other actions, as described herein.

The local hub 110 may include computer logic executed by its processor coupled to the communication unit and input/output devices. The computer logic may perform the operations of the local hub 110 described herein, such as connecting to and receiving signals from the buttons 112, connecting to and transmitting signals to the application server 122, communicating with other buttons, speakers, microphones, or computing devices, such as a smart hanger 132, and/or receiving signals from the application server 122 (e.g., instructions to output audio or display information on the output device), for example. Other components of the local hub 110 may be described in reference to the example computer device in FIG. 6.

In some implementations, the buttons 112a . . . 112n may include hardware buttons which may, for example, generate a signal in response to being actuated or pressed. In some implementations, a button 112 may include a wireless radio (e.g., Bluetooth, Near Field Communication, RFID, etc.) that may generate and transmit a signal to the local hub 110 indicating that the button 112 has been actuated. Alternatively or additionally, a button 112 may have a wired/electrical contact based connection configured to transmit the signal from the button 112 to a local hub 110 or to a smart button hanger 132, which in turn connects to the local hub 110, as described herein.

A button 112 may, in some implementations, also include a battery and a microchip for performing basic processing operations, such as programmably receiving, storing, and transmitting a button identification code (button ID), item type, action type, and/or connecting to another computing device, such as the local hub 110 and/or a smart hanger 132. In some implementations, a button 112 may be externally powered and configured to, for example, in response to receiving the external power, transmit a button ID. For instance, the button 112 may receive a current via one or more electrical contacts, which powers an internal circuit of the battery, which internal circuit may send (e.g., via the electrical contacts) the button ID to the smart hanger 132, for example, as described in further detail below.

For example, each button 112 may have associated therewith a button ID, which may be transmitted in a signal to the local hub 110 (e.g., directly or via a smart button hanger 132) and may identify the particular button 112 to the local hub 110 and/or the enterprise application 126. In some implementations, the button ID may combine with a local hub ID, for example, to uniquely identify the button 112, stock room, local hub 110, an account associated with the button 112, etc. In some implementations, the button 112 may be linked to a button ID in the memory of a local hub 110, so that the local hub 110 maps the particular button 112 to a button ID and, in response to receiving a signal from the button 112, translates the signal to a button ID and transmits the button ID to the application server 122.

In some implementations, a button ID may be programmed to match an item ID (which may be referred to herein simply as item), such as a stock keeping unit (SKU), Universal Product Code (UPC), etc. In some instances, the button ID may reference (e.g., in a database 128 accessible to the local hub 110 and/or the application server 122) or include data describing attributes of an item, order (e.g., account number, quantity, etc.), and/or account, etc.

A set of buttons 112 representing the specific inventory or order pattern of items of a particular stock room, user, company, account, etc., can be used with a particular local hub 110 and/or smart hanger 132. For example, company 1 may have a stock room where items A, B, and C are stocked and regularly ordered (e.g., ordered from a store, second stock room, inventory center, or fulfillment center), but company 2 may have a stock room where items B, D, E, and F are stocked and regularly ordered. In this example, 3 buttons 112 respectively mapped to items A, B, and C may be connected to a local hub 110 associated with company 1, and 4 buttons 112 respectively mapped to items B, D, E, and F may be connected to a local hub 110 associated with company 2. In the event that company 1 starts ordering item F, a new button 112 mapped to item F (e.g., specifically for orders by company 1 or for generally for orders of item F) may be connected to the local hub 110 of company 1 or a blank or unmapped button 112 may be custom mapped to item F and connected to the local hub 110 of company 1. Accordingly, buttons 112 connected to a particular local hub 110 can be added, removed, and/or, in some instances, (re)programmed to match the needs of a particular inventory and order pattern.

A button 112 (or a smart hanger 132 coupled with a button 112) may transmit a signal to the local hub 110 indicating that the button 112 has been actuated. The signal may include, for example, the button ID, the number of times the button 112 was pressed (e.g., within a defined time period), the duration of a button 112 press, a time/date when the button 112 was pressed, etc. For example, the button 112 (or a smart hanger 132 coupled with a button 112) may include logic allowing the button 112 to transmit information describing different actions (e.g., a single, double, or triple button press) to the local hub 110. In some implementations, some or all of this information may be added to the button 112 actuation information by the local hub 110 or smart button hanger 132 upon receiving an actuation signal from the button 112. The button 112 (or a smart hanger 132 coupled with a button 112) may also transmit other information to the local hub 110, such as connection, battery, or diagnostic information. For example, the button 112 (or a smart hanger 132 coupled with a button 112) may transmit its battery level via the local hub 110 to the enterprise application 126 (separately or in an actuation signal), which can ascertain, based on the battery level and its level of use (e.g., how frequently the button 112 is actuated), when to replace the button 112 or battery and automatically dispatch a new button 112 or battery.

The smart hanger 132 may be an intermediary device coupling one or more buttons 112 with a local hub 110, although, in some implementations, it may be integrated with the local hub 110 or the functionality of the local hub 110 described herein. For example, the smart hub 110 may provide power and/or communication services to a button 112 to relay information from the button 112 to an application server 122, for example, via the network 102, and, in some implementations, the local hub 110. In some implementations, the smart hanger 132 may include one or more button mounts and one or more electrical contacts. For instance, a button mount may receive and detachably retain an interchangeable button and an electrical contact providing electrical power and/or data communication to the interchangeable button 112.

Figure 3:
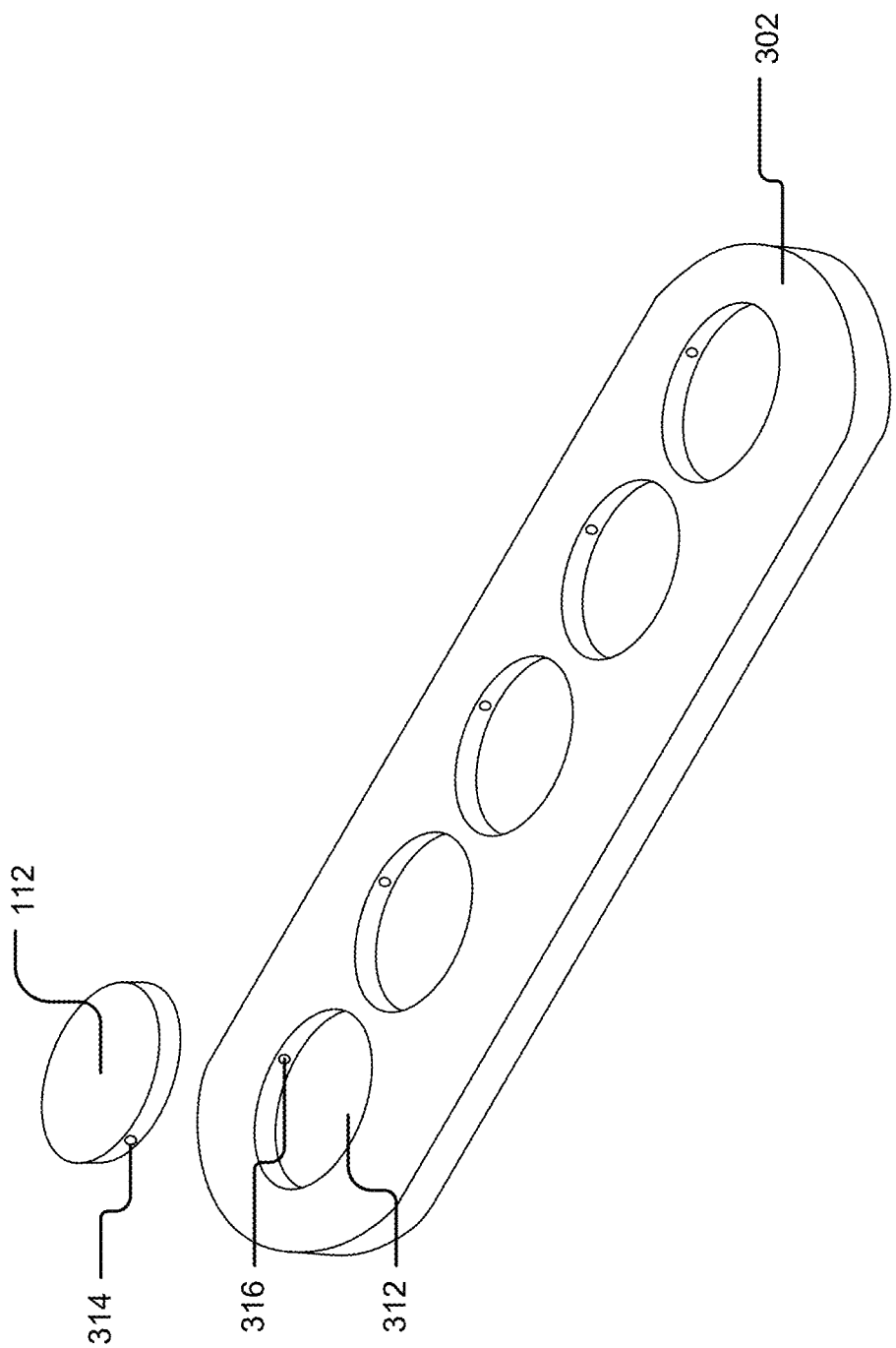
FIG. 3 illustrates an example button and a button hanger.

In some instances, the buttons 112 may be held by a button hanger 302, such as is described in reference to FIG. 3. A smart button hanger 132 is described in further detail herein, for example, in reference to FIGS. 4A-4D. It should be noted that one or both of the hangers 302 and 132 may also or alternatively be referred to as button holders and use of the term "hanger" should not be construed as requiring the hanger to "hang" itself or buttons.

In some implementations, the system 100 may include an activation mechanism 116 that prevents actions from being taken when buttons 112 linked to a particular local hub 110 are accidentally actuated or when the buttons 112 are actuated by an unauthorized user. The activation mechanism 116 may be a device that connects to the buttons 112, smart hanger 132, local hub 110, or application server 122, for example, to activate or deactivate a set of buttons 112. For instance, the presence and/or use of an activation mechanism 116 may change a setting on the local hub 110, smart hanger 132, or application server 122 allowing the signals from the buttons 112 to be transmitted, received, and/or processed. For example, the activation mechanism 116 may be a device that interacts with a local hub 110 or smart hanger 132 to activate the buttons 112 (e.g., by authenticating the user). For example, the activation mechanism 116 may be a wireless device, such as a keychain or fob (e.g., as described in reference to FIGS. 4D and 5A-5C), a wearable device, smartphone, etc. An activation mechanism 116 may be integrated with the local hub 110 and/or smart hanger 132, for example, the activation mechanism 116 may include a keypad, touch screen interface, microphone, or other input device integrated with the local hub 110. In some implementations, the activation mechanism 116 may include a button 112 (e.g., as described in reference to FIG. 1, 4B, or 5B, etc.) that is programmed or mapped (e.g., in the local hub 110 or database of 128 accessible to the application server 122) to one or more activation or authentication actions. For example, when a button 112 programmed as an activation mechanism 116 is actuated, local hub 110 or application server 122 may activate the other buttons 112 connected to the local hub 110. The activation mechanism 116 is described in further detail in reference to FIG. 2B, for example.

The application server 122 may include a web server 124, an enterprise application 126, and a database 128. In some configurations, the enterprise application 126 may be distributed over the network 102 on disparate devices in disparate locations or may reside on the same locations, in which case the client device 106a and/or the application server 122 may each include an instance of the enterprise application 126 and/or portions thereof. The client devices 106 may also store and/or operate other software such as a client application 108, an operating system, other applications, etc., that are configured to interact with the application server 122 via the network 102. In some implementations, the application server 122 and the enterprise application 126 may be located on a server remote to the local hub 110, such that the local hub 110 communicates with the application server 122 (e.g., via the network 102) to perform actions, thereby reducing complexity of the local system (e.g., a local hub 110, buttons 112, and, in some instances, client device(s) 106) in a stock room or facility.

The application server 122 and the third-party server 118 have data processing, storing, and communication capabilities, as discussed elsewhere herein. For example, the servers 122 and/or 118 may include one or more hardware servers, server arrays, storage devices and/or systems, etc. In some implementations, the servers 122 and/or 118 may include one or more virtual servers, which operate in a host server environment.

In some implementations, the enterprise application 126 may receive communications from the local hub 110 in order to place orders for restocking a stock room, closet, or other facility at which the local hub 110 is located. For instance, the enterprise application 126 may receive a signal from the local hub 110 including information identifying the button 112, such as a button ID, which identifies the button 112 to the enterprise application 126. The enterprise application 126 may also map new, blank, or unmapped buttons 112 to particular items, actions, quantities, etc., or may remap existing buttons 112. In some implementations, the enterprise application 126 may perform additional operations and communications based on the information received from local hubs 110, as described elsewhere herein.

The database 128 may be stored on one or more information sources for storing and providing access to data, such as the data storage device 608. The database 128 may store various information describing buttons 112, local hubs 110, customers, items, inventories, preferences, etc. For instance, the database 128 may store a mapping of buttons 112 (e.g., button IDs) to particular items available from a first or third party vendor (e.g., via the third-party server), particular local hubs 110 or users (e.g., for a specific stock room, stock closet, kitchen, facility, or company) to which the buttons 112 are linked or communicatively coupled, particular actions (e.g., activation, confirmation, etc., as described elsewhere herein), or other data. The mappings of the buttons 112 may be stored in a table or other type of database, as described below.

In some implementations, the information about the buttons 112 stored in the database 128 may include connection information, battery level, linked hub information, specific actions taken in response to types of button presses (e.g., how many of an item to order in response to a defined number, duration, or pattern of button presses), urgency of corresponding item orders (e.g., a triple button press may automatically cause an immediate order and over-night delivery of a corresponding item), quantities of items, whether the button 112 is a customizable or static button 112, preferences specific to the button 112, etc.

The database 128 may store other information relative to local hubs 110 (e.g., battery, connection status, buttons 112 linked to the hub, associated account information, activation mechanism 116, authentication requirements, etc.), client devices 106, stock rooms, payment information, customer (e.g., a user, local hub 110, and/or company) profiles, order histories, customer preferences, etc. For example, the database 128 may track types, quantities, frequency, etc., of items ordered via a particular button 112, local hub 110, user, or company. The database 128 may also or alternatively store other data relevant to the operation of the system 100, as described throughout this disclosure.

A third-party server 118 can host services such as a third-party application (not shown), which may be individual and/or incorporated into the services provided by the application server 122.

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2A:
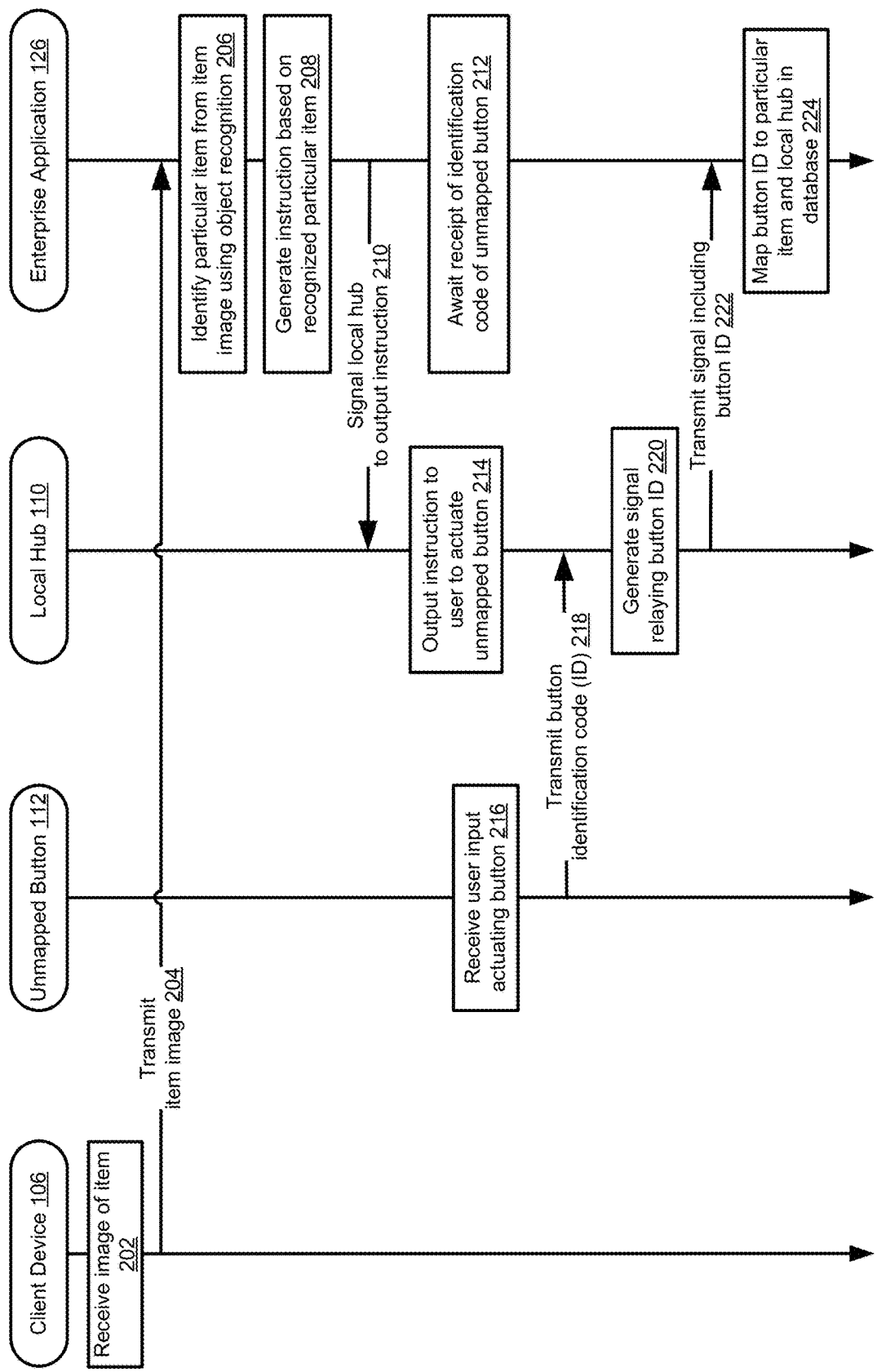
FIG. 2A is a data communication diagram illustrating an example communication and process flow for mapping a new, customizable, mappable, or blank button.

FIG. 2A is a data communication diagram 200*a* illustrating an example communication and process flow for mapping and using a new, customizable, mappable, or blank button 112 with the system 100. In some implementations, a button ID may be unique to each specific button 112 and may be mapped (or may be customizable or mappable, as described herein) to particular information on the database 128. For instance, a unique button ID may be mapped in the database 128 to a particular item, quantity, button 112 behavior (e.g., various types of button 112 presses performing different actions, as described elsewhere herein), user, company, product supplier, price, etc. This mapping may be performed in advance by a stake holder associated with the enterprise application 126, a factory or manufacturer, or it may be performed by a stock room or facilities manager, for example, as described in the diagram 200*a*. In some implementations, a button 112 may additionally or alternatively be mapped to a particular slot on a smart hanger 132 or a particular slot on a smart hanger 132 may be mapped to an item and button 112, for instance.

In the example implementation of FIG. 2A, a client device 106, of a user (e.g., a store room manager), a dedicated device situated in room or other location, etc., can be used to transmit an item description to the enterprise application 126 (e.g., via a web server 124, etc.). The item description may include a bar code, QR code, SKU (stock keeping unit) number, image of a product or box of a product, a natural language description, or a Boolean search query, for example. The item description may be transmitted from the client device 106 to the enterprise application 126 in a signal over text message (e.g., SMS or MMS), e-mail, HTML, etc. By way of further example, the client device 106, may be a portable electronic device (e.g., a mobile phone, a tablet computer, another electronic device equipped with an optical sensor (e.g., a camera), a, personal computer, etc. In some implementations, the client device 106 may include the local hub 110, although in other implementations, the hub may be a simple device that is not capable of capturing, receiving, and/or transmitting pictures, or other complex user inputs.

For example, at 202, a client device 106 may receive and/or capture an image of an item, although, other item descriptions are possible. The client device 106 may transmit the image to an enterprise application 126 operable on a remote server, such as the application server 122.

In some implementations, the client device 106 may also transmit a signal, or an instruction may otherwise be provided, to the local hub 110 and/or the enterprise application 126 indicating that the user wishes to train a button 112 for a new item.

At 204, once the enterprise application 126 receives the signal including the item description from the client device 106, it may process the description to identify the product/item in the description. For example, in instances where the item description includes an item image (e.g., an image of the item, item packaging, etc.), the enterprise application 126 may identify a particular item corresponding to the item image by performing object detection and recognition processing on the image (e.g., using currently available solutions in the field of computer vision). This is beneficial as the stock room manager can quickly capture an image, send the image in an MMS message to the application server 122, and the application server 122 can determine the particular item without the manager having to spend time searching for the particular item type or enter a specific search query.

In some implementations, as described in further detail below, the item description may include text (e.g., via an e-mail, SMS text message, etc.) or a media file, such as audio or video that may be analyzed to identify an item, using information about an item or account associated with the user, local hub 110, and/or client device 106. For instance, an item description indicating "mop" may be first compared with an order history associated with the account to see if a mop has previously been ordered, and if so, the item may automatically be determined to be the previously ordered mop. In some instances, the enterprise application 126 may send a confirmation message. In some implementations, if no matching item is found in the order history, the enterprise application 126 may perform a broader query of available items or seek clarification from the user via the client device 106 and/or the local hub 110.

In some instances, where there is a threshold level of uncertainty in the identity, quantity, color, etc., of the item based on the analysis of the item description, or if additional clarification or customization is possible or requested, the enterprise application 126 may prompt the user via a message transmitted to the client device 106 and/or local hub 110, for instance, to seek clarification or customization. Additionally, in some implementations, the enterprise application 126 may use the order history of the user (or account associated with the user) to more accurately or rapidly identify the particular item, decrease the uncertainty in the object recognition/item identification, or automatically customize actions/orders associated with the particular item for the button 112. For example, the enterprise application 126 may recognize Brand Y pencils based on the item image and then determine, based on the order history of the user, that the user had previously ordered 5 boxes of Brand Y pencils, in response to which determination, the enterprise application 126 may automatically set the default order quantity associated with the button ID to 5 boxes of Brand Y pencils.

At 208, the enterprise application 126 may then generate an electronic instruction (which may include one or more instructions) based on the recognized particular item and, at 210, transmit the instruction in a signal to the local hub 110 (or to the client device 106, depending on the implementation) to output the instruction, which may cause the local hub 110 or client device 106 to direct a user to actuate the unmapped button 112. In some implementations, at 214, the local hub 110 may output the instruction and run the data received from the enterprise application 126 through a text-to-speech application. For example, the instruction generated, transmitted, and output may identify the specific item, quantity, item attributes, etc., of the determined item. The instruction may provide instructions to the user (via the client device 106 and/or the local hub 110) to actuate an unmapped or customizable button 112 within a defined time period. For instance, the enterprise application 126 may then await (e.g., for a defined time period) receipt of an identification code/button ID of an unmapped or customizable button 112 at 212.

Figure 4A:
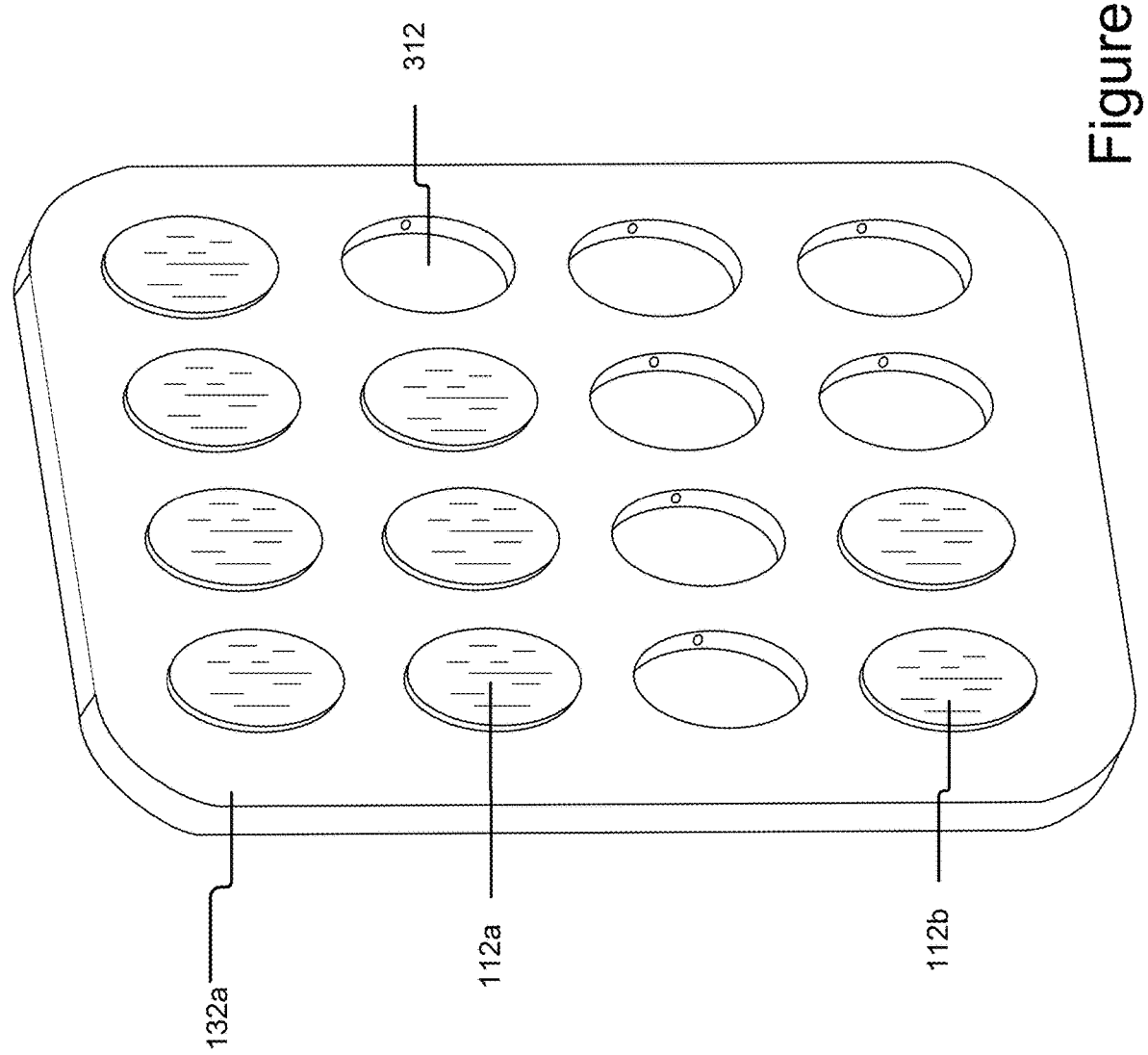
FIG. 4A illustrates an example smart button hanger with example buttons.
Figure 4C:
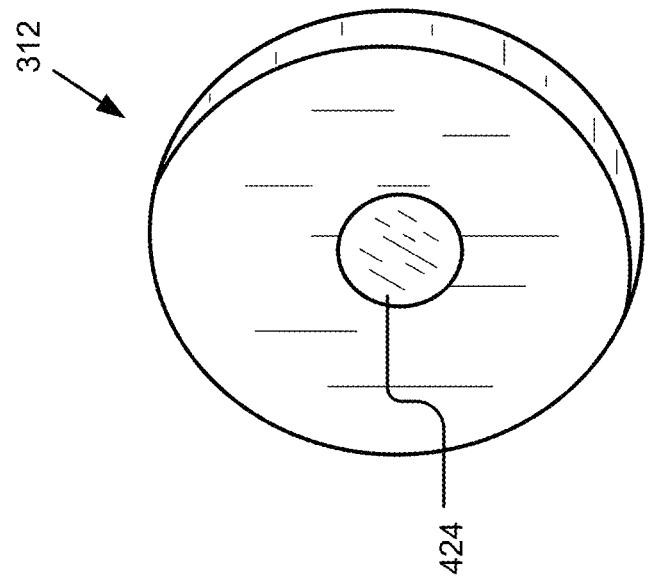
FIGS. 4B and 4C illustrate an example button and mount with electrical contacts.
Figure 4B:
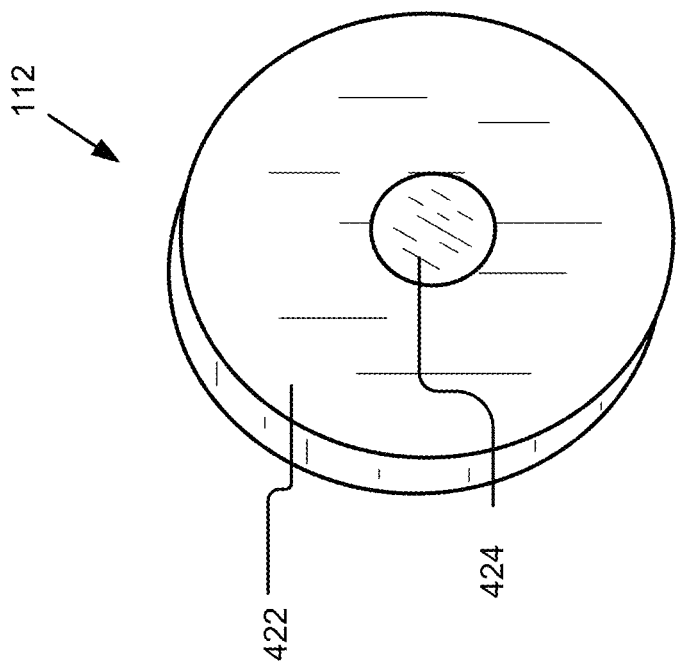

At 216, the user/manager may actuate an unmapped button 112 (or insert a new blank button, such as described according to some implementations of FIGS. 4A and 4B), thereby causing the button 112 to transmit to the local hub 110 (either directly or via a smart button hanger 132), at 218, the button ID in response to receiving the user input.

At 220, upon receiving the signal including the button ID of the actuated button 112, the local hub 110 may generate and, at 222, transmit a signal relaying the button ID to the enterprise application 126. In some cases, if the enterprise application 126 receives the button ID from the unmapped button 112 while the enterprise application 126 is in the await button ID state, at 224, the enterprise application 126 may map the button ID to the identified particular item and, in some instances, the local hub 110 from which the signal was received. The button ID may be mapped to a particular item, quantity, etc., as described elsewhere herein.

In addition to mapping the button 112 to the particular item, the local hub 110 and/or enterprise application 126 may allow the user to further customize the actions taken in response to pressing the button 112, for instance, the user may assign a number of button 112 presses to a particular operation or quantity of the item, for example, one press orders one box, one half shelf capacity, a defined number, or some other quantity of the item while two or three presses of the button 112 orders a different quantity of the particular item.

In some implementations, the mapping of a new, blank, unmapped, or customizable button 112 may trigger an additional action, such as ordering a decal that the user can place on the newly mapped button 112 to identify the button 112 as being associated with the particular action or item. For example, in some implementations, a button 112 may include an attachable face plate or decal that can be attached to a body of the button 112 for identifying the particular item mapped to the button 112.

Figure 2B:
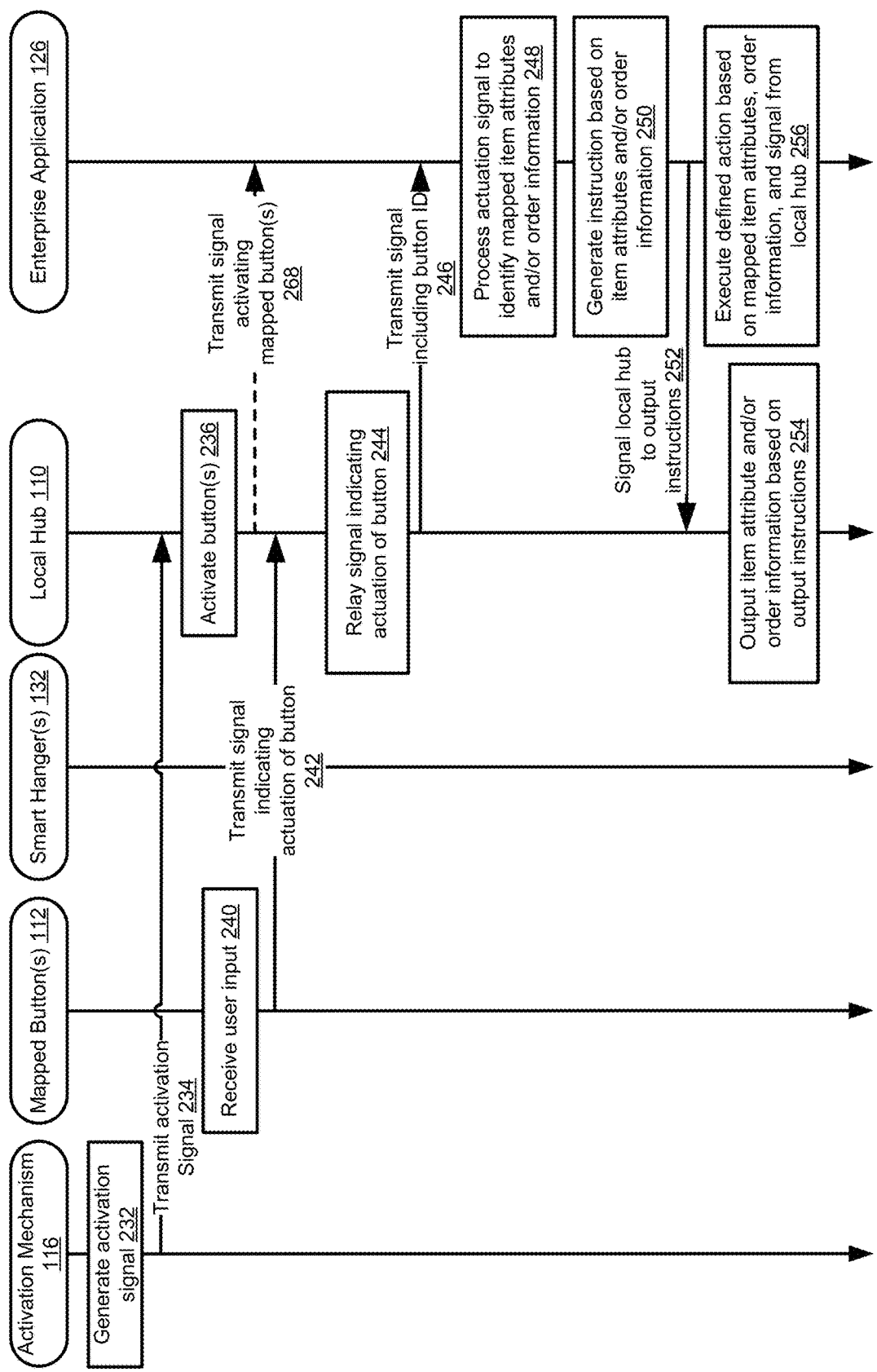
FIG. 2B is a data communication diagram illustrating an example communication and process flow for performing a defined operation based on the activation and/or actuation of a button.

FIG. 2B is a data communication diagram 200b illustrating an example communication and process flow for performing a defined operation based on the activation and/or actuation of a button 112.

At 232, an activation mechanism 116 may generate an activation signal and, at 234, transmit it to the local hub 110 and/or smart hanger 132. In some instances, a user/manager may use an activation mechanism 116 to activate a set of buttons 112, for example, a set of buttons 112 connected to a specific local hub 110 and/or smart hanger 132. In some implementations, the activation mechanism 116 may be a button 112 (connected directly to a local hub 110 or connected indirectly to the local hub 110 via a smart hanger 132) mapped to operations that include activating, deactivating, or other operations. For instance, in implementations where an activation mechanism 116 includes a button 112 (e.g., an activation button 116) connected to the local hub 110 via wired or wireless connection, directly or via the smart hanger 132, for example, the activation button 116 may be pressed once to activate the set of buttons 112 connected to the local hub 110 and twice to deactivate the set of buttons 112 and, in some instances, place an order corresponding to the buttons 112 pressed while the buttons 112 were activated (or, for example, the order may be confirmed and submitted in response to tapping and holding the button 112). For example, an activation button 116 may be placed off to the side of an entry to a stock room so the user may single press the activation button 116 upon entering the room to activate the buttons 112 in the room (e.g., for a defined time period or until deactivation is triggered) and, upon exiting the room, the user may double press the activation button 116 to deactivate the buttons 112. The double press may also be configured to immediately send, order, or confirm the order placed by pressing the activated buttons 112 in the room. In some implementations, the button 112 may be actuated using a non-touch gesture, voice actuation, or other input. In such implementations, the button 112 may include corresponding sensors to detect the input (e.g., camera to detect physical non-touch gestures, microphone to detect a voice command, etc.) and corresponding processing logic executable to process and respond to such input. An example implementation of an activation mechanism is described at least in reference to FIG. 5B herein.

In some implementations, activation of the buttons 112 may automatically trigger a timer, after which the buttons 112 are timed-out or deactivated. For instance, upon activation, the buttons 112 in a room or connected to a local hub 110 may be active for 5 minutes, after which the buttons 112 are automatically deactivated and will no longer function (whether at a button 112, local hub 110, or enterprise application 126 level) until they are activated again.

Figure 2C:
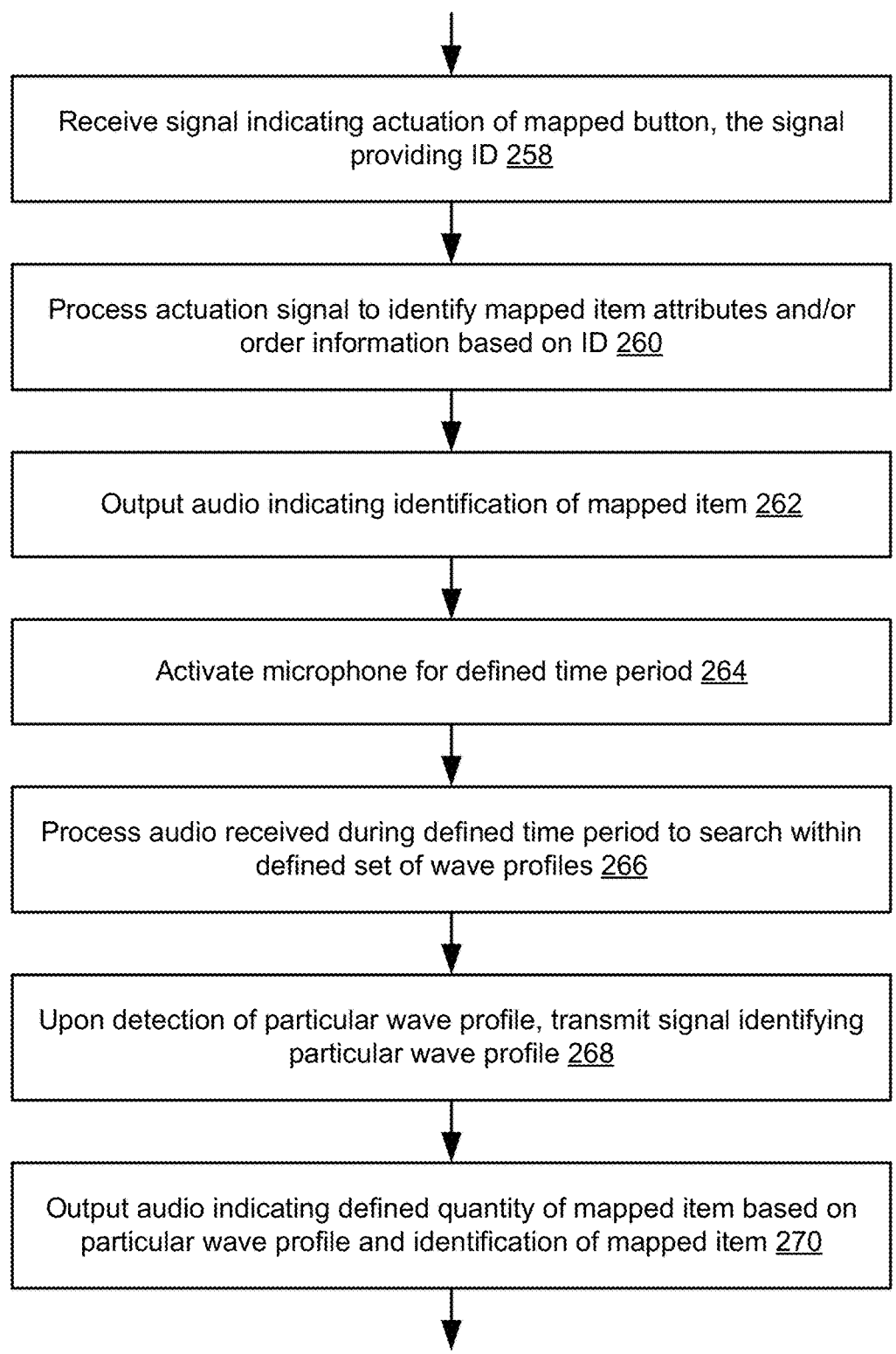
FIGS. 2C and 2D are a data communication diagrams illustrating example communication and process flows for performing a defined operation based on the actuation of a button, including determining a quantity of an item.

In some implementations, a single press of the activation mechanism 116 may activate the buttons 112 while two presses of the activation mechanism 116 deactivates the buttons 112, for example, using the same method as described in reference to FIG. 2C. In some implementations, although not illustrated, the enterprise application 126 may transmit a notification to the client device 106 that buttons 112 have been activated or deactivated.

Figure 5A:
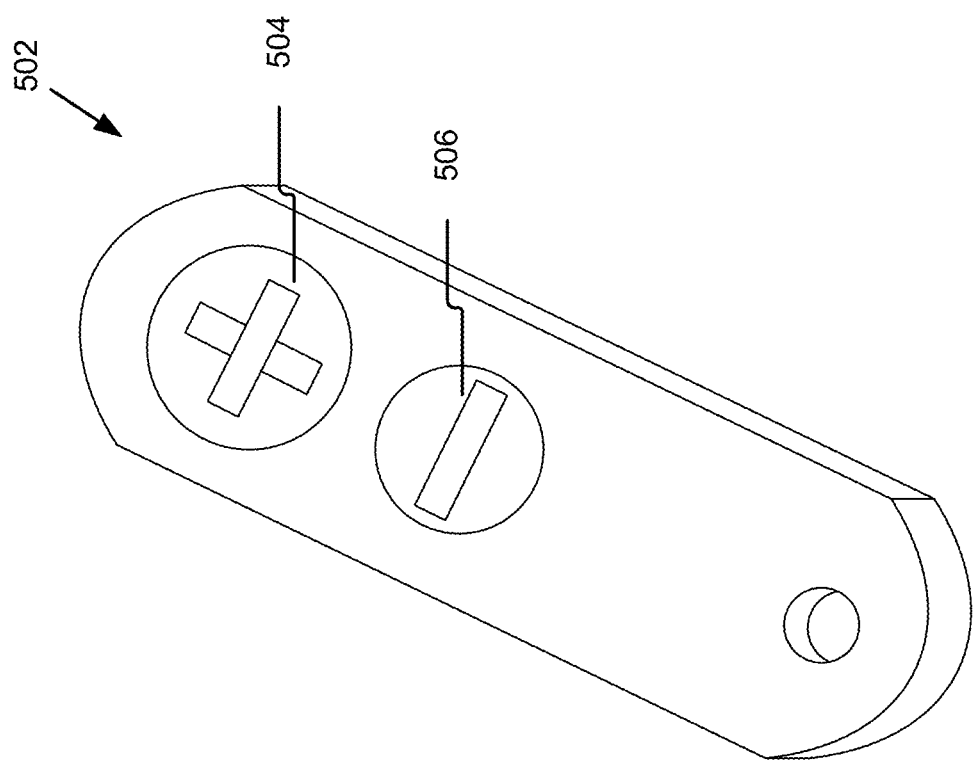
FIG. 5A illustrates an example remote control device for communicating with a local hub.
Figure 5C:
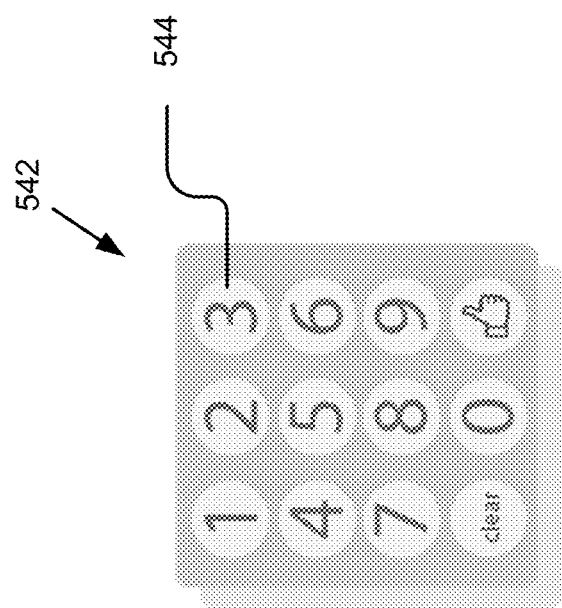
FIG. 5C illustrates an example remote keypad mechanism.
Figure 5B:
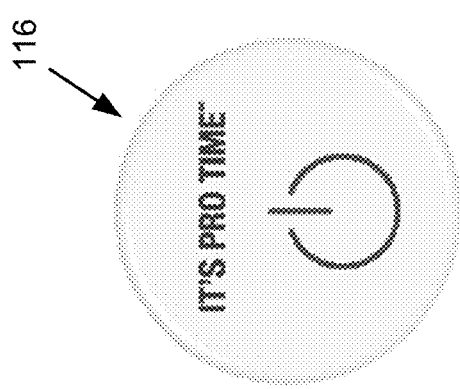
FIG. 5B illustrates an example activation mechanism.

In some implementations, the activation mechanism 116 may include other devices, such as a smart phone, wearable device, or other device that may signal activation of the buttons 112 when it is within a defined range of the local hub 110, for example, as described in reference to FIG. 5A-5C.

At 236, upon receipt of the activation signal by the local hub 110, the local hub 110 may activate the set of buttons 112 which are linked to the local hub 110. This activation may be performed at the level of the local hub 110 (e.g., by the hub connecting to or beginning passing signals from the buttons 112 to the enterprise application 126), the level of a smart hanger 132, or a the level of the enterprise application 126, for example, the local hub 110 may relay, at 268, the activation signal to the enterprise application 126, which then knows (in response to receiving the activation signal or having the activation signal validated by the local hub 110) to accept signals from the mapped buttons 112 (or buttons 112 being mapped, as in FIG. 2A) as valid. In some implementations, the activation signal signals the buttons 112 to connect to the local hub 110 to power on or the local hub 110 to begin accepting signals indicating that the button 112 has been pressed.

At 240, the button(s) 112 may receive user input, for example, a button 112 may receive a single, double, triple, or long press. At 242, in response to receiving the user input, the mapped buttons 112 may transmit the signal indicating actuation of the button 112 to the local hub 110 directly or via the smart hanger 132, as described below. For example, the local hub 110 may receive an actuation signal from a particular button 112 of a set of interchangeable buttons 112 communicatively coupled with the local hub 110. The signal may include the button ID, number of times the button 112 was pressed, and/or other information, such as battery level and connection status. In some implementations, the button ID may include information identifying the type of button 112 (e.g., a button 112 for ordering Brand X paper) and the signal received from the local hub 110 (e.g., by the enterprise application 126) may identify both the type of button 112 and local hub 110 identification information, so that together, the local hub 110 identification information and the button ID may identify the particular button 112 and the actions or information associated with the button 112.

The local hub 110 may then, at 244, relay the signal indicating the actuation of a button 112 (or, in some instances, multiple buttons 112) in a transmission, at 246, to the enterprise application 126. For example, the local hub 110 may transmit a signal including a button ID of the particular button 112 to the enterprise application 126 on the remote server based on the particular button 112 being activated and the local hub 110 receiving the actuation signal from the particular button 112. For example, the local hub 110 may receive an actuation signal including a button ID of the button 112 from the interchangeable button 112 via a communication unit of the local hub 110.

In some implementations, the signal transmitted by the local hub 110 may include a button ID and additional information relating to the actuation of a button 112, which additional information may be generated by the button 112 or the local hub 110 (e.g., the local hub 110 may add additional information to the button ID transmitted by a given button 112). For example, the signal may further include the time and date of actuation of the button 112, whether the button 112 was activated at the time it was pressed, hub identification information, information identifying a user who pressed or activated the button 112 (as described elsewhere herein in reference to the activation mechanism 116), for how long and/or how many times the button 112 was pressed, button 112 battery level, connection, or other button 112 diagnostic information, hub battery level, connection, or other hub diagnostic information, or any other that may information used for the techniques described herein. This information may be stored and linked or mapped together by the enterprise application 126 in the database 128 for further access and processing according to the techniques described herein.

In some implementations, if a button 112 is pressed when the system/buttons 112 are activated, the local hub 110 may issue an audible message or a notification may be transmitted (e.g., via the local hub 110 or enterprise application 126) to the client device 106. For instance, if a button 112 is pressed when it is not activated, the local hub 110 may output an audible "Please do not touch. Please see a manager for reordering supplies." Additionally or alternatively the enterprise application 126 may transmit a notification to the manager than the inactive button 112 has been pressed (e.g., with an identification of the date, time, and specific button 112 or local hub 110).

At 248, in some implementations, the enterprise application 126 may process the actuation signal to identify mapped item attributes and/or order information corresponding to the button ID (e.g., account information, local hub 110 information, etc.) of the actuated button 112 and, in some instances, the number of times the button 112 was pressed. The enterprise application 126 may determine an item associated with the particular button 112 and attributes of the item based on the button ID of the particular button 112 and a mapping of button IDs to items in a database 128 accessible by the enterprise application 126. For instance, the enterprise application 126 may determine a particular item mapped to the button ID, the quantity of the item corresponding to the number of button presses, the price of the item (e.g., from a particular vendor or specific to an account associated with the button ID, local hub 110, or account). In some implementations, the enterprise application 126 may add a cost of the determined quantity of the item to a running total cost of a current order.

In some implementations, after a button 112 is pressed and the button ID and associated information are identified, the enterprise application 126 may determine a quantity of the particular item for a button 112 press (or multiple button 112 presses) based on a user preference, matched audio wave profile (e.g., as described in reference to FIGS. 2C and 2D), order history, shelf capacity, predicted date at which the current inventory of the item will be depleted based on predicted usage and order history, etc. For example, if a facilities manager, local hub 110, account, etc., typically (e.g., within a standard deviation or other threshold frequency) orders 12 boxes of paper, a single button 112 press may be mapped to/order this quantity. If less frequently (e.g., within a second defined threshold) the facilities manager orders 16 boxes of paper, then a double button 112 press may be mapped to/order this quantity. In some implementations, some or all of the button 112 presses (e.g., a double button 112 press) may cause the enterprise application 126 to dynamically determine a quantity of the item to order based on order history, optimal quantity for a price discount, etc., as described above. It should be noted that the quantity and type of items can be further customized and that although different button 112 presses and computer learning effects are discussed in relation to item quantity, they may also relate to item type, color, etc.

At 250, once the item attributes and, in some instances, order information are identified, the enterprise application 126 may generate an instruction based on the item attributes and/or order information, for example, based on a defined user, local hub 110, button 112, account, or administrator preference. The enterprise application 126 may transmit a signal to the local hub 110 including the instructions and indicating to output the instructions via the output device of the local hub 110 at 252.

At 254, the local hub 110 may output information including the item attribute(s), order information, and/or other notifications (e.g., a low battery notification) based on the instructions. In some implementations, the output may include a confirmation of the item, quantity, or cost. In some implementations, the output may also include a running total of the current order or notifications when specific quantities or prices are reached. For instance, the user may place a limit on the total value of any given order (e.g., $2,500) and the output may include an audio notification that the value has been reached or is being approached. In some instances, the frequency of notifications of running total cost, total quantity of items, or any other value mapped to the actuated buttons 112, may be presented to the user as the value approaches a defined threshold. It should be understood that one or more dynamic or static limits or notifications may be programmably placed on a given order or item or set of orders or items (e.g., a total of $3,000 for a day, week, month, or year of orders). For example, a speaker of the local hub 110 may indicate that the total for the order or set of orders has reached certain amounts (e.g., $1,000, $1,500, $2,000). These settings, operations, and values (along with others described herein, for instance) may be processed, tracked, and notifications sent by the enterprise application 126 to reduce the complexity and cost of the hub while increasing redundancy, security, and speed of the system as a whole.

In some implementations, the enterprise application 126 may also or alternatively transmit the item attributes and/or order information to a client device 106 associated with the local hub 110/account/actuated buttons 112. For instance, based on a defined preference, the enterprise application 126 may send a text message, instant message, e-mail, push notification, or update a spreadsheet, online cart, or webpage when an item (or set of items, order, etc.) is added or removed using the mapped buttons 112 and/or upon completion of an order.

At 256, the enterprise application 126 may execute a defined action based on the mapped item attributes, order information, and signal(s) from the local hub 110. For instance, the enterprise application 126 may transmit notifications, update spreadsheets or other forms, place an order (whether as a batch of items or item by item), order a replacement button 112 (e.g., based on diagnostic, battery, connection, or obsolescence data of the button 112), and/or perform other operations based on a defined trigger.

In some implementations, the enterprise application 126 may place a batch order with items ordered using the buttons 112 from a particular local hub 110 or group of local hubs 110 (e.g., when a user or organization has a local hub 110 in a kitchen, stock room, or at other locations) in response to a trigger (e.g., a defined time, button press, etc.). For instance, at a defined time (e.g., 4 pm) the enterprise application 126 may batch the items ordered using the buttons 112 over a defined time period (e.g., since 4 pm the previous day). The enterprise application 126 may also transmit a notification to the client device 106 of a user (e.g., as identified by being mapped to a button ID, local hub 110, account, or based on use of an activation mechanism 116) that the order has been submitted, the notification including details about the items and order and, in some instances, an option to adjust the order within a defined time period. Other triggers may include the actuation of an activation button 116 (e.g., a double press, as described above), departure of an activation mechanism 116 from the proximity of a local hub 110, confirmation using a button 112 integrated with the local hub 110, confirmation on a graphical interface presented on a client device 106, and so forth.

In some implementations, a defined action taken by the enterprise application 126 may include updating a database 128 or spreadsheet of an organization to track internal inventory or orders. For instance, some organizations have large building or campuses of buildings with multiple sub-storage areas, such as stock rooms, kitchens, closets, etc., where items are stocked and, in some instances, may have a main storage area where items are distributed from the main inventory to the individual stock rooms, etc. One or more of the sub-storage areas may have a set of buttons 112 and a local hub 110. When the buttons 112 are actuated, the local hub 110 may transmit the signal directly to a server or other client device 106 associated with the organization or large storage area so that inventory and orders within the organization can be authorized and tracked. In some implementations, each of the local hubs 110 transmits signals to an application server 122 associated with a third-party (e.g., on the third-party server 118), which then provides the item, and order information to one or more client devices 106 associated with the organizations.

In some implementations, a janitor in such an organization may actuate a set of buttons 112 connected with a local hub 110 (e.g., wirelessly, wiredly, via a smart hanger 132, etc.) in a janitor's closet. The local hub 110 may transmit signals including the button IDs to a client device 106 (either directly or via the enterprise application 126, as described above). The client device 106 and/or the enterprise application 126 may update a database 128 with the requests from the janitor's closet, which may be fulfilled within the organization, provided to the janitor as a reminder of requested items so that the janitor may retrieve the items from the main storage area, or provided for processing by the organization. For instance, the organization, using a client device 106 of the organization, may submit one or more orders to the enterprise application 126 for processing or fulfillment by one or more vendors. The orders may include the items ordered as well as, in some implementations, additional metadata, such as which items were ordered by a particular local hub 110 or user, so that, upon fulfillment, the appropriate items may be delivered to the correct sub-storage area, or may be, in some instances, delivered to the main storage area to replenish its inventory.

FIG. 2C is a block diagram illustrating an example method 200c for performing a defined operation based on the activation and/or actuation of a button 112 including determining a quantity of an item corresponding to the actuated button 112. For instance, the method 200c may include adjusting, using speech recognition, a quantity of items ordered by actuating a mapped button 112. It should be noted that the operations of the method 200c may be combined with the other operations of the methods described herein and may include additional or fewer features without departing from the scope of this disclosure.

In some implementations, at 258, the local hub 110 (although the operations of the method 200c may be performed by a smart hanger 132) may receive a signal indicating actuation of a mapped button 112 (e.g., in response to a user pressing a button 112). For instance, the signal may include an ID identifying the button 112 and/or item, for example, as described above. The signal may be received by a component of the system 100, such as a smart hanger 132, local hub 110, or application server 122.

In some implementations, at 260, the local hub 110 may process the actuation signal to identify mapped item attributes or order information based on the button ID, for example, as described elsewhere herein. In some implementations, the local hub 110 may process the actuation signal by transmitting the button ID to an application server 122, as described elsewhere herein. It should be noted that, in some instances, the local hub 110 may wait to transmit the signal with the button ID until a quantity of an item is known (e.g., based on 268 below).

In some implementations, at 262, the button 112, smart hanger 132, local hub 110, or another component of the system 100 may output audio (or visual) information indicating identification of the mapped item, receipt of the input from the button 112, and/or instruction to provide a quantity. For instance, the audio may include a beep or other sound or may include an audible (e.g., text to speech) identification of the item (e.g., "granola bars"). In some implementations, the audio may identify a quantity of the item ordered. For instance, a single button press may order 4 boxes of cereal, a double button press may order 6 boxes of cereal, and a triple button press may order 8 boxes of cereal. For example, after receiving an actuation signal indicating that the button 112 was pressed twice, a speaker or other device coupled with the local hub 110, button 112, or smart hanger 132, may output audio confirming 6 boxes of cereal. As described in further detail elsewhere herein, the quantities corresponding to button presses may be user selectable, learned based on order history, or defined based on another parameter.

At 264, in some implementations, in response to receiving the actuation signal, the local hub 110, smart hanger 132, or button 112 may activate a microphone coupled with one of these components 110, 112, or 132, for a defined time period. For instance, in response to receiving a signal from a button 112, a local hub 110 may activate a microphone for 3 seconds (or another defined time period), or until the time elapses or a recognized audio signal or another button press is received, after which the local hub may deactivate the microphone. For instance, the time period may be set to 3 seconds, but may terminate early if received audio matches an audio wave profile, as described below, or another button press is received. In some implementations, the microphone may be deactivated outside of the time period to increase security and prevent unintended activation. In some implementations, the defined time period may begin after the audio output described above has completed.

In some implementations, at 266, a processor coupled to the microphone may process audio received via the microphone. In some implementations, the processor may be in a local hub 110 or smart hanger 132, although it may be in another device. For instance, a local hub 110 may be configured to receive a signal to activate a microphone, process audio to search for a defined sound pattern (e.g., representing a spoken quantity) or audio wave profile, and transmit a signal identifying an identified sound pattern/wave profile to another component of the system 100. In some instances, the local hub may store a set of audio wave profiles on a local storage device coupled with the local hub, so that processing can be performed locally instead of transferring the audio over a network 102. As such, only defined words may be recognized and audio is not transmitted to another device (e.g., the application server 122), thereby reducing bandwidth usage and increasing security. Such a stand-alone device may be integrated into the local hub 110, smart hanger 132, or may be stand-alone (e.g., separate from, but communicatively coupled with a local hub 110), thereby increasing security.

In some implementations, the processor coupled with the microphone may perform sound pattern or wave profile matching of audio received during the time period against a database including a defined set of patterns or profiles. For instance, the set may include only those patterns corresponding to numbers between 1 and 100 (or 1-40, 1-20, 1-50, 2-40, or another defined range). In some implementations, the defined set of patterns may also include various languages, for example, it may include a defined pattern/profile corresponding to each of "five," "cinco," and "cinq," etc.

At 268, in some implementations, upon detection of a particular wave profile/pattern, the processor may transmit a signal identifying the particular wave profile. For instance, if the processor detects a wave pattern corresponding to "fifteen," it may transmit a signal to the local hub 110 or other component of the system 100 with the number "fifteen." In some implementations, the signal may not include any audio from the microphone. In some implementations, when the processor is integrated with the local hub 110, in response to recognizing a wave pattern corresponding to a given quantity, the local hub 110 may transmit a wave pattern identification code or a number corresponding to the wave pattern to the application server 122. In some instances, the local hub 110 may transmit the quantity along with a button ID.

As a summary example, in some implementations, the system (e.g., a local hub 110) may receive a button ID from a mapped button 112, determine a default quantity of items corresponding to the button 112, and, in some instances, may output audio indicating the quantity, as described above. In some implementations, if the system received audio input and matched it to one of the defined set of wave profiles or patterns, the system may transmit a signal to the application server 122 indicating to adjust the quantity corresponding to the previous button press based on the matched wave profile. In some instances, the local hub 110 may modify a quantity of the item and then send a signal to the application server 122 identifying the item and/or button ID and the signal. For example, the local hub 110 may generate a file including a button ID and a quantity based on the matched sound pattern, which may cause the application server 122 to override the default quantity associated with the specific button 112/item and replace it with the quantity included in the received file. As such, the system may adapt to instances where an order deviates from a quantity previously associated with a button 112. Accordingly, an order can be placed using an exactly defined item and quantity, for example, as described in further detail elsewhere herein.

At 270, in some implementations, the local hub 110 may output audio indicating a defined quantity of the item mapped to the actuated button 112 based on the particular wave profile and identification of the mapped item. For instance, the audio confirmation may be based on local processing by the local hub 110 or may be based on order details received from an application server 122. For instance, in response to receiving the file from the local hub 110, the application server 122 may transmit (e.g., via the web server 124) a signal including the quantity and/or identification of the item to the local hub 110, which may generate an audible output based on the quantity and/or identification of the item. In some implementations, the application server 122 confirmation may also or alternatively be sent to a client device 106 or account data associated with the user local hub 110.

Figure 2D:
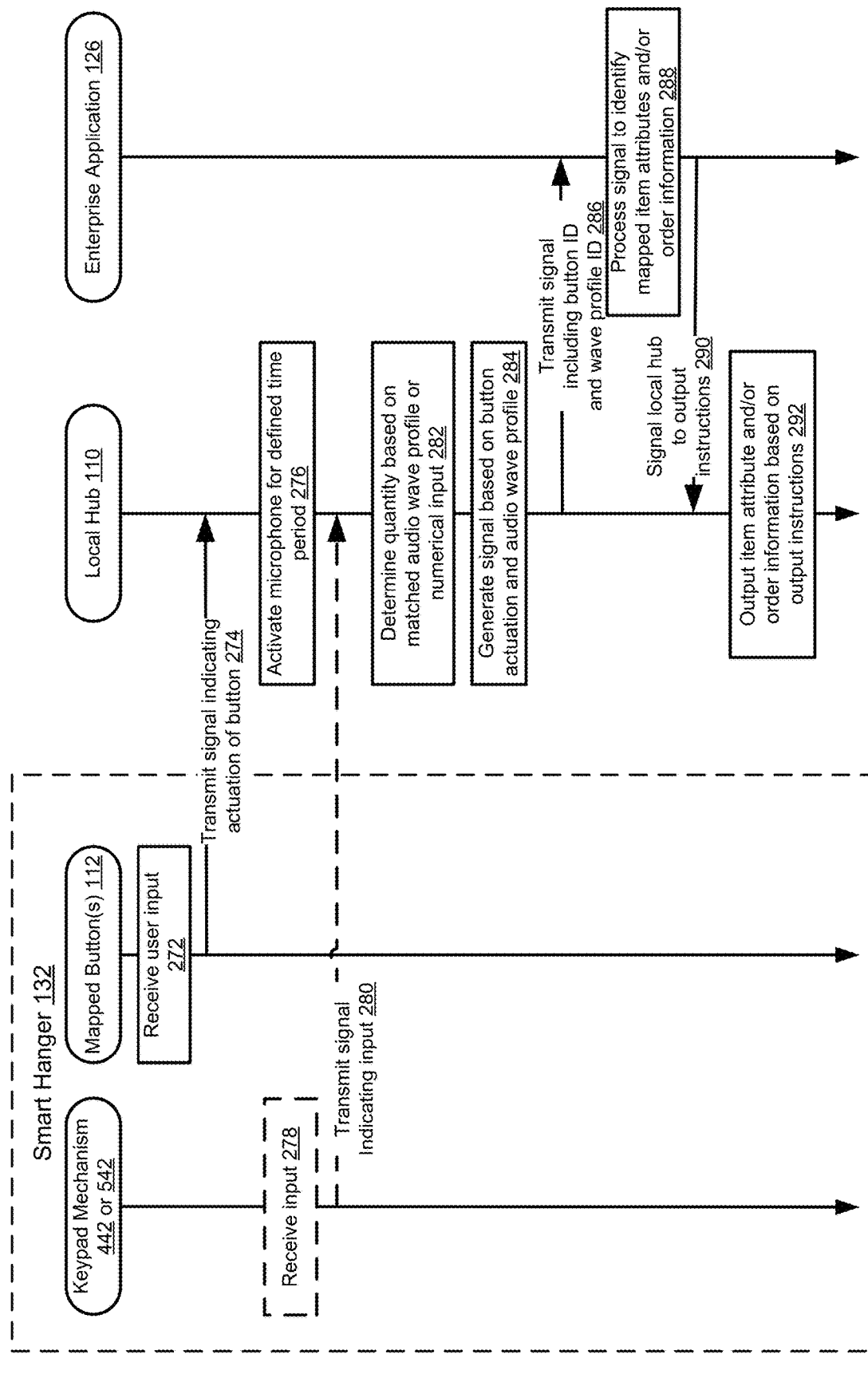

FIG. 2D is a data communication diagram 200d illustrating an example communication and process flow for performing a defined operation based on the activation and/or actuation of a button 112, including determining a quantity of an item, for example, using voice or a keypad 442 (or 542). As illustrated, a keypad mechanism 442 and/or button 112 may be coupled with a smart hanger 132. For instance, the button 112 may be an interchangeable button 112 coupled with the smart hanger 132, as described in reference to FIGS. 4A-4D.

In some implementations, the method 200d may include generating and transmitting an activation signal, activating mapped button(s) 112, receiving user input from the buttons 112 (and/or a smart hanger 132), and transmitting signals to the local hub 110 and or enterprise application 126 as described above, for example, in reference to FIGS. 2A-2C. It should be noted that, as described elsewhere herein, the operations of the buttons 112, smart hanger 132, and/or local hub 110 may be performed on different devices, further delineated, rearranged, or combined. For instance, features of buttons 112 and/or their operations may be combined those described in reference to a smart hanger 132 and/or a local hub 110.

At 272, a user may provide input actuating a button 112 (e.g., a physical actuation or, for instance, a capacitive actuation), which is received by the button 112. At 274, the button 112, in response to the actuation may transmit a button ID to the local hub 110. In some implementations, the button 112 may, for instance, have a Bluetooth connection with the local hub 110. For instance, the button 112 may be an active device that, in response to input, may transmit information to another device, such as the local hub 110. In some implementations, the button 112 may be physically placed in/on a smart button hanger 132, which provides electrical current, and in some instances, processing and/or communication services to the button 112. For instance, the button 112 may be a passive device with limited programmable capabilities. For example, the button 112 may receive a current (e.g., via contact, induction, etc.) from a smart button hanger 132 (or local hub 110, etc., depending on the implementation) and, in response, send its programmed button ID and/or other information to the local hub 110 directly or via the smart button hanger 132. For example, the smart button hanger 132 may be communicatively coupled with the local hub 110 (e.g., via Bluetooth, etc.).

For example, in some implementations, a smart hanger 132 may receive a signal from a button 112 coupled with the smart hanger 132 and may transmit the signal, or a signal derived therefrom, to the local hub 110. In some implementations, a passive button may receive power continuously or only when actuated and may rely on a smart button hanger 132 for communication with the local hub 110 and/or enterprise application 126.

At 276, in some implementations, in response to receiving a signal indicating that a mapped button 112 has been actuated (and/or that a confirmatory output has completed, as described above), the local hub 110 may activate a microphone (e.g., coupled with the local hub 110) for a defined time period (e.g., a capture period). The local hub 110 may process the audio received from the microphone to determine a quantity, which may be used to generate a signal to the enterprise application 126 (e.g., at 284 and/or as described above).

Figure 4D:
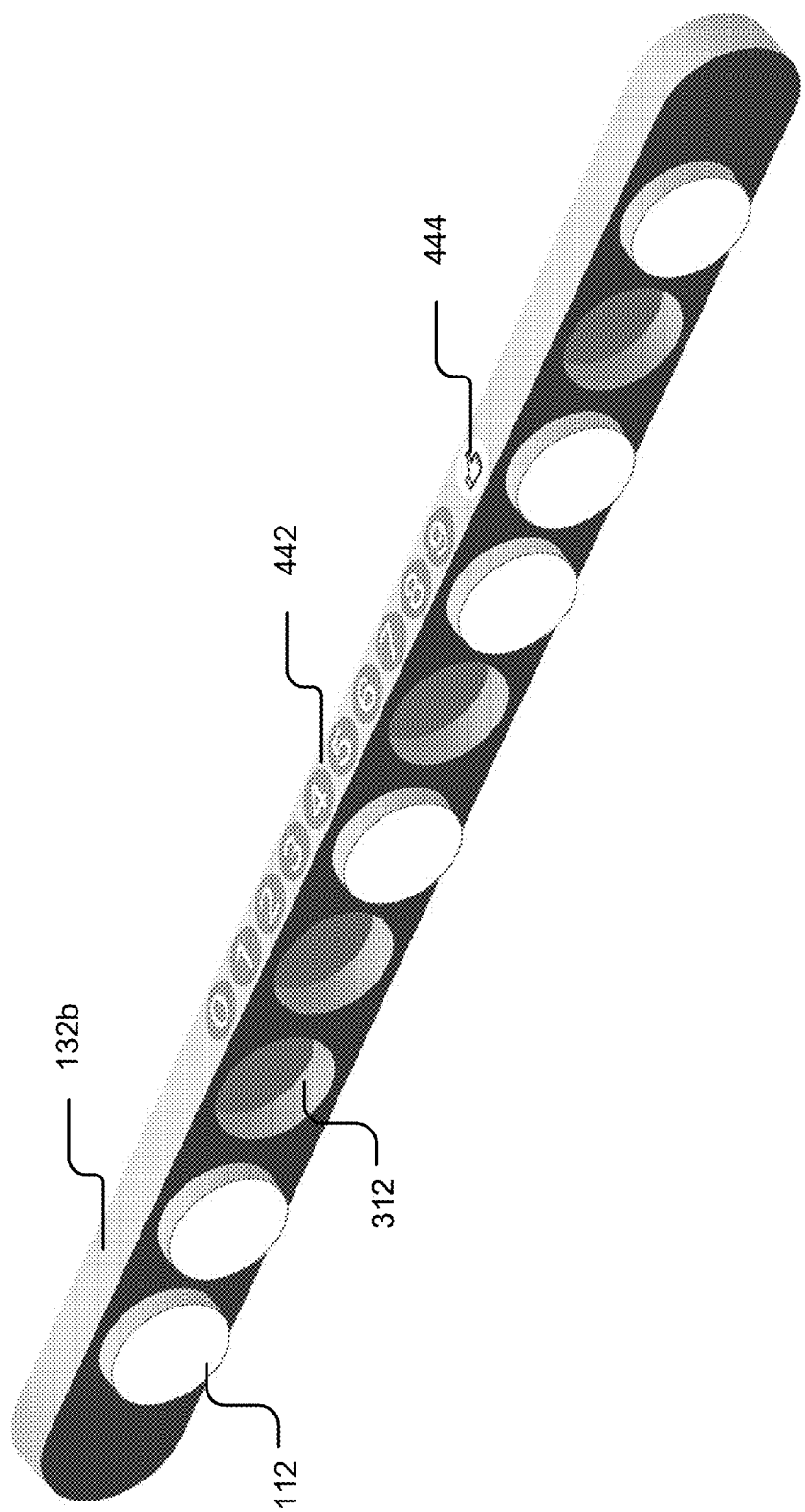
FIG. 4D illustrates an example smart button hanger with example buttons and integrated keypad.

In some implementations, the local hub 110 may also or alternatively activate a keypad mechanism 442 or 542 (e.g., as described in reference to FIG. 4D, 5A, or 5C). For instance, activating the keypad mechanism 442 or 542 may include powering on, connecting to, or otherwise beginning to receive or process input from the keypad mechanism 442 or 542. The defined time period for the keypad 442 or 542 may be the same as for the microphone or may be a different time period. For instance, the keypad may remain active until another mapped button 112 is actuated or an ordering session is completed (e.g., based on the activation mechanism 116), as described elsewhere herein. Accordingly, because the microphone and/or keypad mechanism 442 or 542 isn't always listening for input, the process is more efficient and secure.

At 278, in some implementations, the keypad mechanism 442 or 542 may receive input from a user and, at 280, may transmit a signal based on the input to the local hub 110. In instances where the keypad mechanism 442 is coupled with the smart hanger 132, the smart hanger 132 may process the input to identify the quantity and may transmit a signal including data identifying the quantity to the local hub 110. In instances where the keypad mechanism 542 is a stand-alone device wirelessly coupled with the local hub 110 (e.g., as described in reference to FIG. 5C), the keypad mechanism 542 may process the input and transmit the quantity to the local hub 110, or the local hub 110 may process each button press as incoming data from the keypad mechanism 542 to identify the quantity.

At 282, the local hub 110 may determine the quantity based on the matched audio wave profile or, in some implementations, a numerical input from a keypad mechanism 442 or 542. Because the audio received indicating the quantity is processed on the local device (e.g., the local hub 110) rather than transmitted to a server 122 for processing, the efficiency and security of the process is increased.

In some implementations, the local hub 110 may determine a quantity based on a quantity signal identifying a quantity received from a keypad mechanism 442 or 542, which may be communicatively coupled with the local hub 110.

At 284, the local hub 110 may then use the determined quantity to generate a signal based on the button 112 actuation, the quantity signal from the keypad mechanism 442 or 542, and/or the audio wave profile (e.g., based on the number determined from the audio wave profile). For instance, the quantity determined from the audio command may be combined with the button ID to generate a signal or order request file, which may be transmitted to the enterprise application for processing and completion of the order.

The local hub 110 may generate one or more order signals relaying the order request file and identifying the button ID to the enterprise application 126, for instance, on a remote server (e.g., the application server 122). In some implementations, the local hub 110 may relay the button ID and/or quantity to the enterprise application 126. In some implementations, the local hub 110 may decode a signal (e.g., an actuation signal) from the button 112 including or referencing the button ID and generate a signal to transmit to the enterprise application 126. In some implementations, the local hub 110 may provide additional information in the signal to the enterprise application 126, such as an identification code of the local hub 110, a quantity (e.g., based on the number of times the button 112 was actuated, an input into the keypad 442 or 542, or detected audio wave profile), whether a button 112 and/or local hub 110 is activated, etc.

The order request file may be beneficial as it may define the exact item and quantity desired in a more accurate way than merely using artificial intelligence to listen to a request for an item and then guessing the exact item and/or quantity that a user meant. For instance, the order request file may include an item ID (e.g., a stock keeping unit, universal product code, etc.) or a button ID, which may be mapped to the item ID, as described in further detail above, thereby eliminating ambiguity of voice or button only systems. Further, a two-step interaction (e.g., a button press and a voice interaction) may act as confirmation that the user wishes to perform a particular action (e.g., ordering the item mapped to the button 112).

At 286, the local hub 110 may transmit the signal including the button ID and/or the wave profile ID (or a number) to the enterprise application 126 (e.g., via the Internet), which may process the signal to identify mapped item attributes, quantity, and/or order information, for example, as described above, at 288. For example, the local hub 110 may transmit the one or more order signals to the remote server 122 based on the interchangeable button 112 being actuated and the local hub 110 receiving the actuation signal from the interchangeable button 112. For instance the order signal may instruct the remote server to perform a defined operation using the button ID. It should be noted that, although not shown, the signal may be encrypted.

The enterprise application 126, operating on the server 122, may receive the order signal identifying a button ID from an interchangeable-button hub 110 coupled with one or more interchangeable buttons and an instruction to the server to perform an operation using the button ID.

In some implementations, the enterprise application 126 may determine attributes of an item associated with the interchangeable button based on the button ID, a mapping of button IDs stored on a database accessible to the enterprise application 126, and/or the instruction to the enterprise application 126 to perform a defined operation. For instance, the defined operation may include placing an order for an item associated with the button ID, transmitting a confirmation notification to an interchangeable-button hub 110 or client device 106 (e.g., based on an executed operation), or executing another automated task.

In some implementations, at 290, the enterprise application 126 may transmit a signal to the local hub 110 including output instructions, which may instruct the local hub 110 to output item attribute, quantity, and/or order information based on the output instructions or otherwise provide a confirmatory output at 292, for example, of the performance of a defined operation by the enterprise application 126. As described above, the output may include words, a chime, ding, or other audio or visual output.

FIG. 3 illustrates an example button 112 and a button hanger 302. The button hanger 302 may be mounted 312 to a shelf so that the button 112 is adjacent to a storage location of an item to which it is mapped. The button hanger 302 may include a series of mounts 312 or receptacles which are adapted to receive and retain a button 112 in place, for example.

In some implementations, as illustrated, a button hanger 302 may include an elongated or long narrow body shaped to fit on the front of shelves. The button hanger 302 may include button receptacles/mounts 312 positioned longitudinally along the length of the body and adapted to receive and retain buttons 112. In some implementations, the button hanger 302 may be fitted with magnets, hooks, or other hanging mechanisms to attach the button hanger 302 to a shelf, wall, or door, etc., although it should be noted that a button hanger 302 is not required to "hang." It should be understood that although round buttons 112 and an elongated button hanger 302 are depicted, other sizes, shapes, and configurations of buttons 112 and button hangers 302 are possible and contemplated without departing from the techniques described herein.

As shown, a button 112 may be mounted 312 in a hanger 302 that can be mounted in any orientation (e.g., horizontally, vertically, etc.) from any surface using any suitable fastener, such as an adhesive, hook and loop, snaps, etc. The hangar may include correspondingly sized mounts 312 for the buttons 112. For example, the button 112 may be mounted in the mount 312, etc. In some implementations, a button 112 may include one or more retainers to retain the button 112 in the mount 312. For example but not limitation, as shown in FIG. 3, the button 112 may include one, two, or more protrusions 314 and the mounts 312 may include one or more compatible recesses 316 that mate when the button 112 is mounted 312 in the mount 312. However, it should be understood that any other suitable coupling device (e.g., magnets) could be used to retain the buttons 112 in the mounts 312.

In some implementations, the button 112 may include a processor and a non-transitory memory storing instructions that are executable by the processor to transmit the button ID and/or other information to devices within the button's 112 transmission field, such as the local hub 110 or smart button hanger 132. In some implementations, the button 112 may transmit the button ID using Bluetooth or other near-field communication protocols.

While the hanger 302 is depicted as including five mounts 312 in series, it should be understood that the hanger 302 may include any number of mounts 312 arranged in any sort of pattern. In addition, while the buttons 112 and mounts 312 are depicted as being circular in nature, it should be understood that any suitable shape, geometry, thickness, and/or materials may be used for the buttons 112, the mounts 312, and the hanger 302.

FIG. 4A is an illustration of an example smart button hanger 132a (also referred to herein as smart hanger 132). FIG. 4B illustrates an example backside to a button 112 for use with a smart hanger 132. FIG. 4C illustrates an example mount 312 of a mount 312 of a smart hanger 132 at which a button 112 may be mounted. FIG. 4D illustrates another example smart button hanger 132b.

In some implementations, the smart hanger 132 may include and/or may be wired to a battery or other power source. The smart hanger 132 may include a power module for powering and/or charging the buttons 112. The smart hanger 132 may include processing capability, a communication unit, and/or mounts 312 for interchangeably receiving, retaining, and, in some implementations, communicating with buttons 112. For example, the button 112 and mount 312 (e.g., as illustrated in FIGS. 4B and 4C, respectively) may include contacts 424 and 426 respectively for conveying power and/or data between a smart hanger 132 and button 112. For example, the power module may include charging components, such as a transformer, power regulator, and/or other electrical components transforming the input power source to appropriate an output power source for recharging the battery(ies) of the buttons 112. This is advantageous as it can extend the battery life of the buttons 112 as they are mounted in and held by the smart hanger 132. Other variations are also possible, such as but not limited one where the buttons 112 may not include their own batteries but may effectively be plugged into the hanger's power source when mounted on the smart hanger 132.

A smart button hanger 132 may include several mounts 312 (e.g., slots, connection points, etc.) for interchangeably receiving, retaining, and communicating with buttons 112. For example, the smart button hanger 132 may have a group of mounts 312, which may or may not have buttons 112 inserted thereto, for instance, a set of buttons 112 programmed or otherwise mapped to objects may occupy some or all of the mounts 312, while some mounts 312 may be not have buttons 112 placed therein, so that a user may insert buttons 112 corresponding to specific items (and/or unmapped buttons 112) into the empty mounts 312. As such, the smart button hanger 132 may be configured with the specific set of buttons 112 that a user chooses, such as the button 112a coupled with the smart button hanger 132. In some instances, one or more unmapped buttons 112, such as the button 112b, may be coupled with the smart button hanger 132 to provide an instantly customizable button 112, as described in reference to FIG. 2A, for example.

In some implementations, as illustrated in FIG. 4B, each button 112 may have a contact 424 or set of contacts on the back side 422 (or another position) that enable the button 112 to communicate with a corresponding contact or set of contacts 426 (not illustrated in the example of FIG. 4A or 4D) on a slot or mount 312 of a smart hanger 132. These contacts may transmit the actuation signal from a button 112 to the smart button hanger 132 to identify a particular button 112 that is currently positioned within one of the mounts 312 and, in some instances, provide power to the buttons 112. It should be noted that although the communication mechanism between the buttons 112 and the smart button hanger 132 is described as including contacts, the communication may also or alternatively be wireless, such as using near field communication, radio frequency identification (RFID), etc. For example, the smart hanger 132 may include one or more inductive coils or antenna for transmitting signals between the buttons and the smart hanger 132. For instance, the smart hanger 132 may include an inductive coil (or several, for example, behind the mounts 312 for holding buttons 112), which provide sufficient current to power a button(s) 112, so that the button 112 can transmit its ID or code to the smart hanger 132, etc.

In some implementations, the smart button hanger 132 may include a wireless communication unit (e.g., a Bluetooth radio or other communication unit) for connecting (e.g., by establishing a wireless communication channel between the smart button hanger 132 and the local hub 110) to the local hub 110 in order to further reduce complexity of individual buttons 112 (e.g., by eliminating a wireless radio from the button 112). For instance, the buttons 112 may identify themselves to the smart button hanger 132 (e.g., by transmitting their button IDs via the contacts 424 and 426 or RFID, etc.) and the smart button hanger 132 may then relay the signals received from the buttons 112 to the local hub 110.

In some implementations, the features and operations described above in reference to the local hub 110 may be integrated into the smart button hanger 132, so that the smart button hanger 132 can communicate with the application server 122. For instance, the smart button hanger 132 may include a cellular or Wi-Fi connection to the network 102, an output device/speaker, a processor, etc.

In some implementations, the buttons 112 used with a smart hanger 132 may include a corresponding antenna, coil, and/or computer chip configured to communicate with the smart hanger 132 without the button 112 necessarily having to contain processing or communication capabilities strong enough to communicate wirelessly with a local hub 110 or with an application server 122. For instance, a button 112 may be passive and may only provide a code or ID in response to a request (and potentially, an electrical current) from the smart hanger 132 and/or local hub 110.

In some implementations, a smart hanger 132 may have a circuit board with buttons integrated into the board. The smart hanger 132 may include slots for receiving replaceable decals, which may be used to press the buttons on the circuit board. The slots/buttons integrated into the smart hanger 132 may be mappable to button IDs, items, etc., in the same way as is described above in reference to mappable buttons 112.

The buttons 112 may be interchangeably placed in various of the mounts 312. For instance, a user may remove a particular interchangeable button 112 from a button mount 312 of a smart button hanger 132. The user may then place an interchangeable button 112 of the in the button mount 312 of the smart button hanger 132. For instance, the new interchangeable button 112 may include a different button ID than the original button 112. The new interchangeable button 112 may be adapted to transmit the different button ID to the local hub 110 via the smart button hanger 132. For example, the new button 112 may be plug-and-play, such that it is automatically recognized (either immediately or upon actuation) when placed in the mount 312, so that different interchangeable buttons 112 may perform different actions in the same mount 312 without being specifically programmed.

FIG. 4D illustrates another example implementation of a smart hanger 132b, for instance, a smart hanger 132 may include an elongated body shaped to attach to the front of a shelf on a shelving unit, so that buttons 112 may be placed above, below, or otherwise adjacent to items on the shelf (ves). The smart hanger 132 may include slots, sockets, or mounts 312 for buttons 112 (whether passive or active, as described above) and may include one or more integrated buttons. The smart hanger 132 may include, be integrated with, or communicatively coupled with (e.g., via Bluetooth, electrical contacts, or another communication channel) the local hub 110. In some implementations, the smart hanger 132 may include a keypad mechanism 442, an activation mechanism (e.g., not shown, included in the keypad 442, etc.), an approval button 444, and/or other components (e.g., a microphone, speaker, communication unit, etc., as described above). For example, as illustrated, the smart hanger 132b may include a keypad mechanism 442 (e.g., a number pad) integrated with the smart hanger 132b across a top surface of a body of the smart hanger 132b, although other configurations are possible and contemplated herein. In some implementations, the keypad 442 may serve as an activation mechanism. For example, a particular button/key or sequence of numbers/keys may be pressed on the keypad 442 to activate the smart hanger 132b or all buttons 112 coupled with the smart hanger 132b and/or local hub 110. In some implementations, the keypad 442 may serve as a keypad mechanism as described in reference to FIG. 2D, for example.

In some implementations, a local hub 110 may be connected to various combinations of active buttons 112 (e.g., using Bluetooth, etc., to communicate with the local hub 110) and smart hangers 132 (e.g., with passive buttons 112). Similarly, a smart hanger 132 may include both active (e.g., communicatively connected directly to the local hub 110) and passive buttons 112 (e.g., communicatively connected with the local hub 110 via the smart hanger 132), depending on the implementation.

In some implementations, as described above, a smart hanger 132 may include a battery, which may power passive buttons 112, for example, using a contact, induction coil, or antenna. As such, the battery life of the smart hanger 132 may be more easily managed than the batteries of each individual button 112. In some implementations, the smart hanger 132 may be plugged into an electrical outlet or may have electrical contacts for receiving electrical current from another source. For instance, a rack or shelving system may have built in contacts for providing electrical power to a smart hanger 132, button 112, local hub 110, or other device.

FIG. 5A is an illustration of an example remote control device 502 for communicating with the local hub 110. In some implementations, the remote control device 502 may serve as an activation mechanism 116 activating the buttons 112 as described elsewhere herein in response to a button press on the remote control device 502 or in response to the remote control device 502 being within a defined range of the local hub 110, although other implementations are possible. For example, the remote control device 502 may be paired with a local hub 110 (or multiple local hubs 110) using Bluetooth and, when the remote control device 502 is within a defined range (e.g., based on presence of Bluetooth connection or determination of distance, for instance, based on signal strength), the local hub 110 may activate the set of buttons 112 connected to the local hub 110.

In some implementations, the remote control device 502 may identify and/or authenticate a user to the local hub 110 and/or enterprise application 126. Accordingly, if the user is authenticated, then defined orders, quantities, items, or values may be permitted by the enterprise application 126 to be ordered by that user, according to administrator settings. The signal(s) transmitted by the local hub 110 to the enterprise application 126 may also identify the remote control device 502 to associate the items ordered with a particular user.

In some implementations, the remote control device 502 may include one or more buttons 504 and/or 506 that, when actuated, cause the remote control device 502 to transmit a signal to the local hub 110, which may then relay the signal to the enterprise application 126, for instance. The signal generated by the remote control device 502 may modify an order (e.g., quantity, as described in FIG. 2D) generated in response to a most recent button press of a mapped button 112 connected to the local hub 110. In some implementations, a first button 506 may cause the order quantity of the item to be decreased by a first given amount and a second button 504 may cause the order quantity of the item to be increased by a second given amount. For instance, if a button press of a mapped button 112 causes 8 packages of tape to be placed in an order, then a single press of the first button 506 may reduce the number ordered to 7 or a single press of the second button 504 may increase the number ordered to 9. In some implementations, the buttons 504 and 506 of the remote control device 502 may operate in the same way as the mapped buttons 112 described above.

It should be noted that these quantities are provided as examples. It should also be noted that the remote control device 502 may take other forms and may have additional or fewer buttons (e.g., a separate activation or cancelation button). For instance, the remote control device 502 may be implemented as a keychain or other form factor, or may, in some implementations, be implemented as an application on a client device 106. In some instances, the remote control device 502 may include, for example, a keypad 542, as illustrated in FIG. 5C.

FIG. 5B illustrates an example activation button or mechanism 116. As described in further detail elsewhere herein, the activation mechanism 116 may be an active button communicatively coupled with a local hub 110, or the activation mechanism 116 may be specifically programmed passive button used with a smart hanger 132. The activation mechanism 116 may establish a communication channel with the local hub 110 and may transmit a signal, which indicates to the local hub 110, smart hanger 132, and/or application server 122 to activate the buttons 112, smart hangers 132, and/or local hub 110, for example. In some instances, the activation mechanism 116 may also be pressed to perform other operations, such as canceling an order, completing or placing an order, or deactivating the buttons 112.

FIG. 5C is an illustration of a keypad mechanism 542, which may represent an implementation of, or perform the operations of, an activation mechanism 116, a button 112, remote control device 502, and/or a keypad mechanism 442, as described elsewhere herein. In some implementations, the keypad mechanism 542 may include a battery or other power source, a processor, and a communication unit, such as a Bluetooth radio. In some implementations, the keypad mechanism 542 may be a stand-alone device, or it may be integrated into a local hub 110 or smart hanger 132. The keypad mechanism 542 may include a number pad 544 for receiving input from a user, which it may then transmit to a local hub 110 for processing and/or relaying to the enterprise application 126. For instance, the keypad mechanism 542 may be communicatively coupled with the local hub 110 via a wireless data connection, which allows data to be transferred from the keypad mechanism 542 to the local hub 110, such as a quantity signal identifying a quantity.

In some implementations, the keypad mechanism 542 may be a portable wireless device that can be carried throughout a stock room or janitor's closet. The keypad mechanism 542 may include a magnet or other mounting mechanism for attaching it to a shelving unit, button hanger 302 or 132, local hub 110, or wall.

In some implementations, the activation mechanism 116 and keypad mechanism 542 may be integrated into a single unit or may be placed adjacent to each other within communication range of the local hub 110 or another device (e.g., some implementations of a smart hanger 132 or button 112) capable of relaying signals (e.g., as in a mesh network) to the local hub 110.

Figure 6:
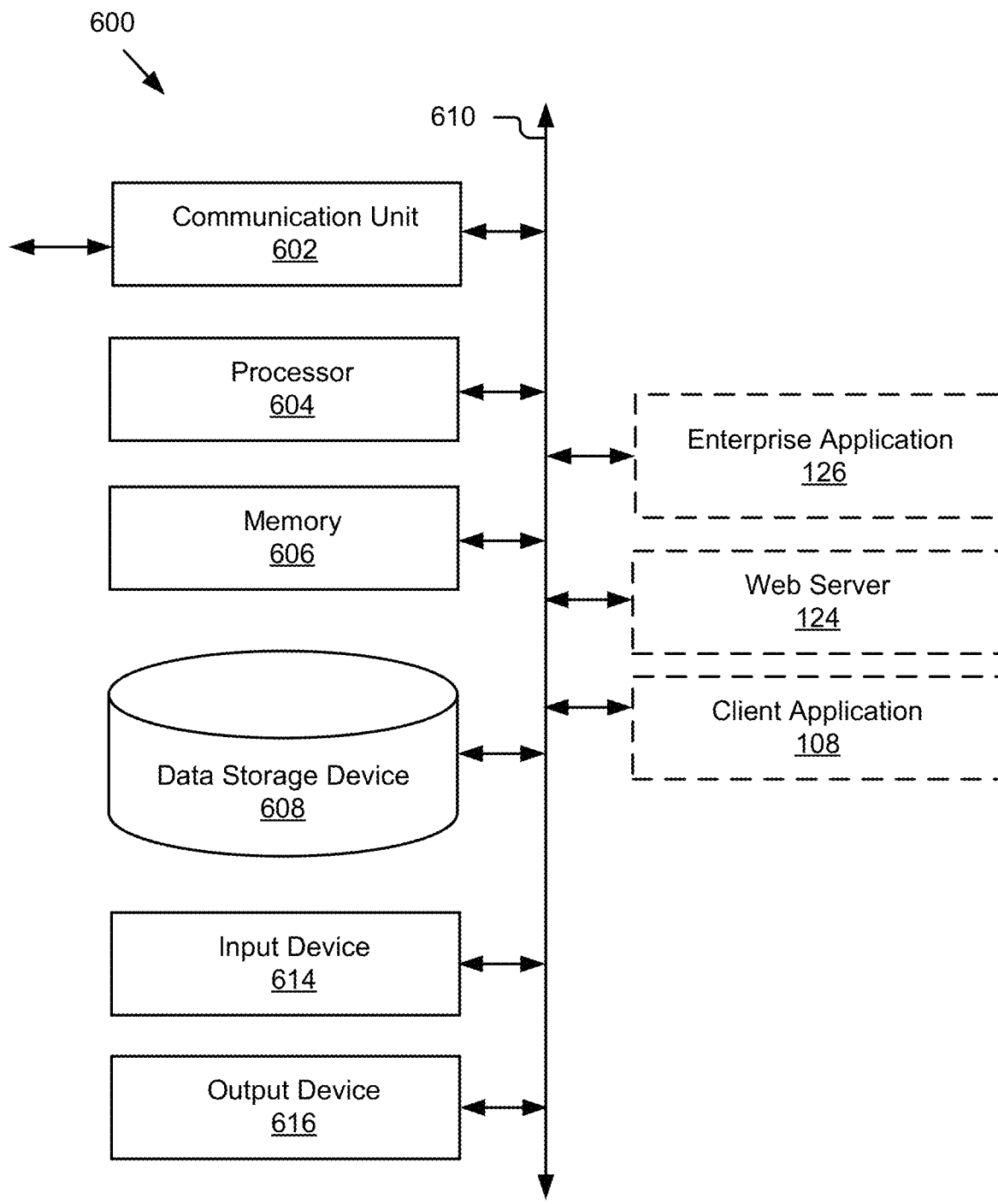
FIG. 6 is a block diagram of an example computing device.

FIG. 6 is a block diagram of an example computing system 600, which may represent the computer architecture of a client device 106, local hub 110, third-party server 118, application server 122, and/or other device described herein, depending on the implementation.

In some implementations, as depicted in FIG. 6, the computing system 600 may include an enterprise application 126, a web server 124, a client application 108, or another application, depending on the configuration. Depending on the implementation, the computing system 600 may represent, for example, a client device 106, a local hub 110, or an application server 122. For instance, a client device 106 may include a client application 108 (which could incorporate various aspects of the enterprise application 126, in some implementations); and the application server 122 may include the web server 124, the enterprise application 126, and/or components thereof, although other configurations are also possible and contemplated.

The enterprise application 126 includes computer logic executable by the processor 604 to perform operations discussed elsewhere herein. The enterprise application 126 may be coupled to the data storage device 608 to store, retrieve, and/or manipulate data stored therein and may be coupled to the web server 124, the client application 108, and/or other components of the system 100 to exchange information therewith.

The web server 124 includes computer logic executable by the processor 604 to process content requests (e.g., to or from a client device 106 or local hub 110). The web server 124 may include an HTTP server, a REST (representational state transfer) service, or other suitable server type. The web server 124 may receive content requests (e.g., product search requests, HTTP requests) from client devices 106, cooperate with the enterprise application 126 to determine the content, retrieve and incorporate data from the data storage device 608, format the content, and provide the content to the client devices 106.

In some instances, the web server 124 may format the content using a web language and provide the content to a corresponding client application 108 for processing and/or rendering to the user for display. The web server 124 may be coupled to the data storage device 608 to store retrieve, and/or manipulate data stored therein and may be coupled to the enterprise application 126 to facilitate its operations.

The client application 108 includes computer logic executable by the processor 604 on a client device 106 to provide for user interaction, receive user input, present information to the user via a display, and send data to and receive data from the other entities of the system 100 via the network 102. In some implementations, the client application 108 may generate and present user interfaces based at least in part on information received from the enterprise application 126 and/or the web server 124 via the network 102. For example, a customer/user 114 may use the client application 108 to receive the product pages provided by the application server 122, view various products available online, add products to a virtual cart, purchase products, receive discounts on products, etc. In some implementations, the client application 108 includes a web browser and/or code operable therein, a customized client-side application (e.g., a dedicated mobile app), a combination of both, etc.

As depicted, the computing system 600 may include a processor 604, a memory 606, a communication unit 602, an output device 616, an input device 614, and a data storage device 608, which may be communicatively coupled by a communication bus 610. The computing system 600 depicted in FIG. 6 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 600 may include various operating systems, sensors, additional processors, and other physical configurations. The processor 604, memory 606, communication unit 602, etc., are representative of one or more of these components.

The processor 604 may execute software instructions by performing various input, logical, and/or mathematical operations. The processor 604 may have various computing architectures to method data signals (e.g., CISC, RISC, etc.). The processor 604 may be physical and/or virtual, and may include a single core or plurality of processing units and/or cores. In some implementations, the processor 604 may be coupled to the memory 606 via the bus 610 to access data and instructions therefrom and store data therein. The bus 610 may couple the processor 604 to the other components of the computing system 600 including, for example, the memory 606, the communication unit 602, the input device 614, the output device 616, and the data storage device 608.

The memory 606 may store and provide access to data to the other components of the computing system 600. The memory 606 may be included in a single computing device or a plurality of computing devices. In some implementations, the memory 606 may store instructions and/or data that may be executed by the processor 604. For example, the memory 606 may store one or more of the enterprise application 126, the web server 124, the client application 108, and their respective components, depending on the configuration. The memory 606 is also capable of storing other instructions and data, including, for example, an operating system, hardware drivers, other software applications, databases, etc. The memory 606 may be coupled to the bus 610 for communication with the processor 604 and the other components of computing system 600.

The memory 606 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 604. In some implementations, the memory 606 may include one or more of volatile memory and non-volatile memory (e.g., RAM, ROM, hard disk, optical disk, etc.). It should be understood that the memory 606 may be a single device or may include multiple types of devices and configurations.

The bus 610 can include a communication bus for transferring data between components of a computing device or between computing devices, a network bus system including the network 102 or portions thereof, a processor mesh, a combination thereof, etc. In some implementations, the enterprise application 126, web server 124, client application 108, and various other components operating on the computing system/device 100 (operating systems, device drivers, etc.) may cooperate and communicate via a communication mechanism included in or implemented in association with the bus 610. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 602 may include one or more interface devices (UF) for wired and wireless connectivity among the components of the system 100. For instance, the communication unit 602 may include, but is not limited to, various types known connectivity and interface options. The communication unit 602 may be coupled to the other components of the computing system 600 via the bus 610. The communication unit 602 can provide other connections to the network 102 and to other entities of the system 100 using various standard communication protocols. In some implementations, the communication unit 602 may include a (or multiple, for example, for communication with a large number of buttons 112 or with multiple sources simultaneously) Wi-Fi, Bluetooth, NFC, RFID, or other radio, and/or may include wired communication units.

The input device 614 may include any device for inputting information into the computing system 600. In some implementations, the input device 614 may include one or more peripheral devices. For example, the input device 614 may include a keyboard, a pointing device, microphone, an image/video capture device (e.g., camera), a touch-screen display integrated with the output device 616, etc. The output device 616 may be any device capable of outputting information from the computing system 600. The output device 616 may include one or more of a display (LCD, OLED, etc.), a printer, a haptic device, audio reproduction device, touch-screen display, a remote computing device, etc. In some implementations, the output device is a display which may display electronic images and data output by a processor of the computing system 600 for presentation to a user, such as the processor 604 or another dedicated processor.

The data storage device 608 may include one or more information sources for storing and providing access to data. In some implementations, the data storage device 608 may store data associated with a database management system (DBMS) operable on the computing system 600. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 608 may organized and queried using various criteria including any type of data stored by them, such as described herein. For example the data storage device 608 may store the database 128. The data storage device 608 may include data tables, databases, or other organized collections of data. Examples of the types of data stored by the data storage device 608 may include, but are not limited to the data described with respect to the figures, for example.

The data storage device 608 may be included in the computing system 600 or in another computing system and/or storage system distinct from but coupled to or accessible by the computing system 600. The data storage device 608 can include one or more non-transitory computer-readable mediums for storing the data. In some implementations, the data storage device 608 may be incorporated with the memory 606 or may be distinct therefrom.

The components of the computing system 600 may be communicatively coupled by the bus 610 and/or the processor 604 to one another and/or the other components of the computing system 600. In some implementations, the components may include computer logic (e.g., software logic, hardware logic, etc.) executable by the processor 604 to provide their acts and/or functionality. In any of the foregoing implementations, the components may be adapted for cooperation and communication with the processor 604 and the other components of the computing system 600.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 10 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A system comprising:
one or more interchangeable buttons, the one or more interchangeable buttons adapted to store and transmit one or more button identifiers associated with the one or more interchangeable buttons to a button holder when the one or more interchangeable buttons are actuated; and
the button holder including one or more button mounts and one or more electrical contacts, the one or more button mounts holding the one or more interchangeable buttons, the one or more interchangeable buttons coupling with the button holder via the one or more electrical contacts, the button holder receiving a first button identifier from a first interchangeable button of the one or more interchangeable buttons based on the first interchangeable button being actuated while held by the one or more button mounts.

2. The system of claim 1, wherein:
the first interchangeable button is adapted to transmit the first button identifier to the button holder via the one or more electrical contacts responsive to the first interchangeable button being actuated.

3. The system of claim 2, wherein:
electrical power used by the first interchangeable button to transmit the first button identifier by the first interchangeable button is received from the button holder via the one or more electrical contacts.

4. The system of claim 1, wherein:
the one or more button mounts include a plurality of button mounts, each of the plurality of button mounts being adapted to detachably hold the first interchangeable button; and
each of the plurality of button mounts include at least one of the one or more electrical contacts.

5. The system of claim 1, wherein:
the button holder includes a power source, a processor, a non-transitory computer-readable medium storing instructions executed by the processor, and a communication unit, the button holder being adapted to receive the first button identifier from the first interchangeable button and transmit information to another computing device via the communication unit using the first button identifier.

6. The system of claim 5, wherein:
the button holder includes one or more non-interchangeable buttons integrated into a body of the button holder, the one or more non-interchangeable buttons being coupled with the processor to perform operations based on actuation of the one or more non-interchangeable buttons.

7. The system of claim 6, wherein:
the one or more non-interchangeable buttons include an approval button that confirms actuation of the first interchangeable button.

8. The system of claim 6, wherein:
each of the one or more non-interchangeable buttons corresponds to a quantity.

9. The system of claim 6, wherein:
the instructions cause the processor to associate a quantity corresponding to an actuated non-interchangeable button with the first button identifier when the actuated non-interchangeable button is actuated within a defined time period of when the first button identifier is received.

10. The system of claim 1, wherein:
the button holder includes an elongated body;
the elongated body includes a plurality of non-interchangeable buttons positioned longitudinally along a length of the elongated body; and
the elongated body includes the one or more button mounts.

11. The system of claim 1, further comprising:
a local hub coupled with the button holder and including a processor and a communication unit, the processor receiving the first button identifier and transmitting data based on the first button identifier to a remote server using the communication unit.

12. The system of claim 11, wherein:
the local hub includes a microphone; and
the processor of the local hub activates the microphone based on actuation of the first interchangeable button.

13. A system comprising:
a button holder including one or more button mounts and one or more electrical contacts, the one or more button mounts adapted to hold one or more interchangeable buttons, the one or more electrical contacts coupling the one or more interchangeable buttons with circuitry of the button holder, the button holder adapted to receive a first button identifier from a first interchangeable button of the one or more interchangeable buttons based on the first interchangeable button being actuated while held by the one or more button mounts.

14. The system of claim 13, wherein:
the one or more button mounts include a plurality of button mounts, each of the plurality of button mounts being adapted to detachably hold the first interchangeable button; and
each of the plurality of button mounts include at least one of the one or more electrical contacts.

15. The system of claim 13, wherein:
the button holder includes a power source, a processor, a non-transitory computer-readable medium storing instructions executed by the processor, and a communication unit, the button holder being adapted to receive the first button identifier from the first interchangeable button and transmit information to another computing device via the communication unit using the first button identifier.

16. The system of claim 15, wherein:
the button holder includes one or more non-interchangeable buttons integrated into the button holder, the one or more non-interchangeable buttons being coupled with the processor to perform operations based on actuation of the one or more non-interchangeable buttons.

17. The system of claim 16, wherein:
each of the one or more non-interchangeable buttons corresponds to a quantity.

18. The system of claim 16, wherein:
the instructions cause the processor to associate a quantity corresponding to an actuated non-interchangeable button with the first button identifier when the actuated non-interchangeable button is actuated within a defined time period of when the first button identifier is received.

19. The system of claim 13, wherein:
the button holder includes an elongated body;
the elongated body includes a plurality of non-interchangeable buttons positioned longitudinally along a length of the elongated body; and
the elongated body includes a plurality of button mounts, the plurality of button mounts including the one or more button mounts.

20. A system comprising:
an interchangeable button including a button body and one or more first electrical contacts, the interchangeable button storing and transmitting one or more button identifiers associated with the interchangeable button to a button holder when the interchangeable button is actuated while the one or more first electrical contacts of the interchangeable button are coupled with one or more second electrical contacts of the button holder, the interchangeable button being interchangeably coupled with the button holder with one or more other interchangeable buttons, the interchangeable button transmitting the one or more button identifiers via the one or more first electrical contacts.

* * * * *